(12) United States Patent
Abbaspourrad et al.

(10) Patent No.: US 12,465,914 B2
(45) Date of Patent: Nov. 11, 2025

(54) METHODS FOR EVALUATING RHEOTAXIS QUALITY IN A SPERM-CONTAINING SAMPLE AND SYSTEMS THEREFOR

(71) Applicant: CORNELL UNIVERSITY, Ithaca, NY (US)

(72) Inventors: Alireza Abbaspourrad, Ithaca, NY (US); Mohammad Yaghoobi, Ithaca, NY (US); Morteza Azizi, Ithaca, NY (US)

(73) Assignee: CORNELL UNIVERSITY, Ithaca, NY (US)

( * ) Notice: Subject to any disclaimer, the term of this patent is extended or adjusted under 35 U.S.C. 154(b) by 321 days.

(21) Appl. No.: 18/258,920

(22) PCT Filed: Dec. 23, 2021

(86) PCT No.: PCT/US2021/065038
§ 371 (c)(1),
(2) Date: Jun. 22, 2023

(87) PCT Pub. No.: WO2022/140648
PCT Pub. Date: Jun. 30, 2022

(65) Prior Publication Data
US 2024/0042440 A1    Feb. 8, 2024

Related U.S. Application Data

(60) Provisional application No. 63/130,142, filed on Dec. 23, 2020.

(51) Int. Cl.
*B01L 3/00* (2006.01)
*G06T 7/00* (2017.01)

(52) U.S. Cl.
CPC ..... *B01L 3/502761* (2013.01); *B01L 3/50273* (2013.01); *G06T 7/0016* (2013.01);
(Continued)

(58) Field of Classification Search
CPC .................. B01L 3/502761; G06T 7/0012
See application file for complete search history.

(56) References Cited

U.S. PATENT DOCUMENTS 9,879,308 B2    1/2018  Holton et al.
2015/0079676 A1    3/2015  Wright et al.
(Continued)

FOREIGN PATENT DOCUMENTS

WO    2016/035799 A1    3/2016
WO    2021/028523 A1    2/2021

OTHER PUBLICATIONS

International Search Report and Written Opinion for International Application No. PCT/US2021/065038 (mailed Mar. 15, 2022).
(Continued)

*Primary Examiner* — Benjamin O Dulaney
(74) *Attorney, Agent, or Firm* — Troutman Pepper Locke LLP (Rochester)

(57) ABSTRACT

The present technology relates to a systems for quantifying rheotaxis in a sperm-containing sample. The system includes a microfluidic system having an inlet for charging fluids into a passage. One or more probes defining a confinement region suitable for retaining motile sperm are within the passage. The system further comprises an image processing computing device for obtaining a sequence of images of the confinement region of at least one of the one or more probes having motile sperm retained therein. The sequence of images of the confinement region is processed to determine a signal intensity value for said sequence of images, wherein said signal intensity value is based on a concentration of the motile sperm located in the confinement region at the flow rate. A rheotaxis quality value is determined for said sperm-containing sample based on the signal
(Continued)

intensity value. Methods for quantifying rheotaxis in a sperm-containing sample are also disclosed.

20 Claims, 28 Drawing Sheets

(52) U.S. Cl.
CPC ............... *B01L 2200/0647* (2013.01); *B01L 2300/0864* (2013.01); *G06T 2207/10016* (2013.01); *G06T 2207/10064* (2013.01); *G06T 2207/20216* (2013.01); *G06T 2207/20224* (2013.01)

(56) References Cited

U.S. PATENT DOCUMENTS

| | | | |
|---|---|---|---|
| 2018/0181792 A1* | 6/2018 | Shafiee | ............... G06T 7/13 |
| 2019/0024045 A1 | 1/2019 | Demirci et al. | |
| 2019/0308192 A1* | 10/2019 | Abbaspourrad | ......... C12N 1/02 |
| 2020/0032199 A1 | 1/2020 | Repetto | |
| 2020/0254456 A1 | 8/2020 | Spero et al. | |
| 2021/0178394 A1 | 6/2021 | Asghar | |
| 2023/0234057 A1* | 7/2023 | Fair | ...................... C12M 21/06 |

OTHER PUBLICATIONS

Zaferani et al., "Rheotaxis-based Separation of Sperm With Progressive Motility Using a Microfluidic Corral System," Proc. Natl. Acad. Sci. 115(33):8272-77 (2018).

Martinez-Fresneda et al., "Characterization of the Rheotaxis Response of Bull Sperm Using a Microfluidic Device," Animal Reproduction Science 169:109-110 (2016).

Extended European Search Report for European Application No. 21912216.5 (mailed Oct. 15, 2024).

Sakkas et al., "DNA Fragmentation: Mechanisms of Origin, Impact on Reproductive Outcome, and Analysis," Fertility and Sterility 93(4):1027-1036 (2010).

\* cited by examiner

D

E

Experiments

Simulation

D

E

Simulation ns application is a national stage application under 35
U.S.C. § 371 of International Application No. PCT/US2021/
065038, filed Dec. 23, 2021, which claims the priority
benefit of U.S. Provisional Patent Application No. 63/130,
142, filed Dec. 23, 2020, which is hereby incorporated by
reference in its entirety.

METHODS FOR EVALUATING RHEOTAXIS QUALITY IN A SPERM-CONTAINING SAMPLE AND SYSTEMS THEREFOR

FIELD

The present invention relates to methods for evaluating rheotaxis quality in a sperm-containing sample and systems therefor.

BACKGROUND

The female reproductive tract simultaneously guides and selects high-quality sperm using rheotaxis in mammalian species. However, sperm quality has long been evaluated only by its movements and concentration through the well-known computer assisted sperm analysis, ignoring sperm rheotaxis.

Mammalian sperm face a tortuous path including cervix, uterotubal junction (UTJ), cumulus cell matrix, and zona pellucida toward the oocyte in the female reproductive tract. Suarez, "How Do Sperm Get to the Egg? Bioengineering Expertise Needed!" *Exp. Mech.* 50:1267-74 (2010). Sperm is equipped with several important features to overcome each of these barriers to deliver the genetic load to the oocyte. Motility is one crucial feature that helps sperm accomplish this task. Also, oviductal secretions after coitus, generate a fluid flow from oviduct to uterus which has been proposed to guide motile sperm to fertilization site by positive rheotaxis. Miki et al. "Rheotaxis guides mammalian sperm," *Curr. Biol.* 23:443-52 (2013); Tung, et al. "Emergence of upstream swimming via a hydrodynamic transition," *Phys. Rev. Lett.* 114:108102 (2015). Narrow lumen of UTJ combined with the robust fluid flow provides a fluid mechanical barrier that selects for the most rigorously motile sperm which can swim against that current. Suarez, et al. "Sperm transport in the female reproductive tract," *Hum. Reprod. Update* 12:23-37 (2006); Zaferani, et al., "Rheotaxis-based separation of sperm with progressive motility using a microfluidic probe system," *Proc. Natl. Acad. Sci. U.S.A.* 115:8272-7 (2018); Zaferani, et al. "Strictures of a microchannel impose fierce competition to select for highly motile sperm," *Sci Adv* 5:eaav2111 (2019). Hence, sperm which can show rheotactic behavior are potentially of higher quality.

Rheotaxis is a passive consequence of sperm motility and does not require Ca2+ influx or change in beating pattern (Zhang, et al. "Human sperm rheotaxis: a passive physical process," *Sci. Rep.* 6:23553 (2016); Schiffer, et al. "Rotational motion and rheotaxis of human sperm do not require functional CatSper channels and transmembrane Ca2+ signaling," *EMBO J.* 39:e102363 (2020)) a feature that helps sperm for fertilization. However, it reveals significant aspects of sperm quality. Rheotaxis-based selected spermatozoa showed improved chromatin maturity (De Martin, et al. "Positive rheotaxis extended drop: a one-step procedure to select and recover sperm with mature chromatin for intracytoplasmic sperm injection," *J. Assist. Reprod. Genet.* 34:1699-708 (2017)), improved morphology and reduced DFI (Romero-Aguirregomezcorta, et al. "Sperm selection by rheotaxis improves sperm quality and early embryo development," *Reproduction* 161:343-52 (2021)) and lesser pregnancy loss (Abdel-Ghani, "Implications of ram sperm rheotaxis analysed by microfluidics for fertility," *Reprod. Domest. Anim.* 55:1541-7 (2020)). These features improve the chance of fertilization for a sperm sample even at low doses of insemination compared to raw semen. Nagata, et al. "Live births from artificial insemination of microfluidic-sorted bovine spermatozoa characterized by trajectories correlated with fertility," *Proc. Natl. Acad. Sci. U.S.A.* 115: E3087-96 (2018). This highlights the importance of rheotaxis and the role that it plays in fertilization.

From the start of microscopic cinematography, sperm evaluation methods began to be developed for kinetic parameters (Rothschild "A new method of measuring sperm speeds," *Nature* 171:512-3 (1953); Rothschild "A New Method of Measuring the Activity of Spermatozoa," *J. Exp. Biol.* 30:178-99 (1953)) and semen concentration such as sperm motility index (Bartoov, et al. "Sperm motility index: a new parameter for human sperm evaluation," *Fertil. Steril.* 56:108-12 (1991)) and sperm quality analyzer. Iguer-Ouada, et al. "Validation of the sperm quality analyzer (SQA) for dog sperm analysis," *Theriogenology* 55:1143-58 (2001). CASA was introduced for objective evaluation of sperm parameters and since then has become the most common method of sperm quality assessment. Liu, et al. "Computerized evaluation of sperm cell motility," 10:127-38 (1977). Yet lack of standards in the chamber dimension, video frame rate, and quality of the images resulted in discrepancy among data. Bompart, et al. "CASA-Mot technology: how results are affected by the frame rate and counting chamber," *Reprod. Fertil. Dev.* 30:810-9 (2018); Dardmeh, et al. "Comparison of commercially available chamber slides for computer-aided analysis of human sperm," *Syst. Biol. Reprod. Med.* 67:168-75 (2021). Moreover, CASA parameters do not necessarily evaluate fertilization capacity of a semen and do not reflect the role that female reproductive tract plays in sperm selection. Wang, et al. "Limitations of semen analysis as a test of male fertility and anticipated needs from newer tests," *Fertil. Steril.* 102:1502-7 (2014).

Moving forward, in the recent decade, burgeoning microfluidic devices allowed for higher precision and point-of-care (POC) analysis. Beckham et al. "A microfluidic device for motility and osmolality analysis of zebrafish sperm," *Biomed. Microdevices* 20:67 (2018); Kashaninejad, et al. "Advances in microfluidics-based assisted reproductive technology: From sperm sorter to reproductive system-on-a-chip," *Adv. Biosyst.* 2:1700197 (2018); Kashaninejad, et al. "Biological diagnosis based on microfluidics and nanotechnology [Internet]" *Nanotechnology and Microfluidics* 211-38 (2020); Nosrati, et al. "Microfluidics for sperm analysis and selection," *Nat. Rev. Urol.* 14:707-30 (2017). Microfluidics has been used for precise identification of normal sperm morphology (de Wagenaar, et al., "Towards microfluidic sperm refinement: impedance-based analysis and sorting of sperm cells," *Lab Chip* 16:1514-22 (2016)), beating amplitude (You, et al. "Live sperm trap microarray for high throughput imaging and analysis," *Lab Chip* 19:815-24 (2019)), and frequency (de Wagenaar, et al. "Spermometer: electrical characterization of single boar sperm motility," *Fertil. Steril.* 106:773-80.e6 (2016)) at the single cell level by differential impedance measurement and single cell trapping. At the semen level, sperm concentration has been estimated by impedance-based microfluidics (Chen, et al. "Sperm quality assessment via separation and sedimentation in a microfluidic device," *Analyst* 138:4967-74 (2013); Segerink, et al. "On-chip determination of spermatozoa concentration using electrical impedance measurements," *Lab Chip* 10:1018-24 (2010)), fluorescent labeling of motile spermatozoa on chip (McCormack, et al. "A novel microfluidic device for male subfertility screening," J. Urol. 175:2223-7 (2016)) or paper-based microfluidics. Nosrati, et al., "Paper-Based Quantification of Male Fertility Potential," *Clin. Chem.* 62:458-65 (2016). Incorporation of smartphones in microfluidic chambers for measurement of various characteristics of sperm such as viability, DNA fragmentation, hyaluronic binding assay (Dimitriadis, et al., "Automated smartphone-based system for measuring sperm viability, DNA fragmentation, and hyaluronic binding assay score," *PLoS One* 14:e0212562 (2019)), as well as motility and concentration was developed recently. Kanakasabapathy, et al. "An automated smartphone-based diagnostic assay for point-of-care semen analysis," *Sci. Transl. Med.* [Internet] 9 (2017). These systems provide POC data of sperm parameters and help availability of the test for deprived communities all around the world. Despite the efforts to improve these measurement techniques, there is a controversy about whether sperm motility parameters and concentration can determine fertility. Guzick, et al., "Sperm morphology, motility, and concentration in fertile and infertile men." *N. Engl. J. Med.* 345:1388-93 (2001). In assisted reproductive techniques (ARTs), fertilization rate shows a positive trend with progressive motility. Simon, et al. "Sperm DNA damage or progressive motility: which one is the better predictor of fertilization in vitro?" *Syst. Biol. Reprod. Med.* 57:133-8 (2011); Villani, et al., "Are sperm parameters able to predict the success of assisted reproductive technology? A retrospective analysis of over 22,000 assisted reproductive technology cycles." *Andrology* [Internet] 13123 (2021). Although in vivo fertility and sperm rheotaxis ability have hitherto been neglected or unknown.

The present invention is directed to overcoming these and other deficiencies in the art.

SUMMARY

One aspect of the present technology relates to a system for quantifying rheotaxis in a sperm-containing sample. The system includes a microfluidic system that includes a housing having a first end and a second end and containing a passage connecting the first and second ends. An inlet is at the first end of said housing for charging fluids into the passage proximate to the first end of said housing and an outlet is at the second end of said housing for discharging fluids from the passage proximate to the second end of said housing, whereby fluid flows from said inlet, through the passage, and into said outlet. One or more probes are within the passage, each of said probes comprising a closed side and a partially open side, wherein the closed side is closer to the first end than the partially open side with the closed side and the partially open side defining between them a confinement region suitable for retaining motile sperm. The system further includes an image processing computing device comprising a non-transitory computer readable medium comprising programmed instructions stored thereon and one or more processors coupled to the computer-readable medium and configured to execute the stored programmed instructions to obtain a sequence of images of the confinement region of at least one of the one or more probes after a sperm-containing sample is injected through the inlet, through the passage, and through the outlet of said microfluidic system at a flow rate, whereby motile sperm are retained within the one or more probes, the one or more probes having said motile sperm retained therein over a period of time. The sequence of images of the confinement region is processed to determine a signal intensity value for said sequence of images, wherein said signal intensity value is based on a concentration of the motile sperm located in the confinement region at the flow rate. A rheotaxis quality value is determined for said sperm-containing sample based on the signal intensity value.

Another aspect of the present technology relates to method of evaluating rheotaxis quality in a sperm-containing sample. The method includes providing a microfluidic system that includes a housing having a first end and a second end and containing a passage connecting the first and second ends. An inlet is at the first end of said housing for charging fluids into the passage proximate to the first end of said housing and an outlet is at the second end of said housing for discharging fluids from the passage proximate to the second end of said housing, whereby fluid flows from said inlet, through the passage, and into said outlet. One or more probes are within the passage, each of said probes comprising a closed side and a partially open side, wherein the closed side is closer to the first end than the partially open side with the closed side and the partially open side defining between them a confinement region suitable for retaining motile sperm. A sperm-containing sample is injected through the inlet, through the passage, and through the outlet of said microfluidic system at a flow rate, whereby motile sperm are retained within the one or more probes. A sequence of images of the confinement region of at least one of the one or more probes is obtained, by an image processing computing device, the one or more probes having said motile sperm retained therein over a period of time. The sequence of images of the confinement region is processed, by the image processing computing device, to determine a signal intensity value for said sequence of images, wherein said signal intensity value is based on a concentration of the motile sperm located in the confinement region at the flow rate. A rheotaxis quality value is determined, by the image processing computing device, for said sperm-containing sample based on the signal intensity value.

The present technology advantageously provides methods and systems for quantifying rheotaxis in a sperm-containing sample using a microfluidic system that mimics the dimensions and hydrodynamic features of the female reproductive tract. The quantified sperm rheotaxis ability can be utilized for evaluating semen quality. The result of the method provides a rheotaxis quality index (RHEOLEX) that, along with motile sperm concentration, can be used to quantify sperm fertility levels in natural conception at various shear rates within 5 minutes. This means that the rheotaxis quality index can be used as a biomarker for determining male in vivo fertility unlike conventional semen quality parameters that fail to provide statistically significant predictions. Moreover, high values for the rheotaxis quality index associates with low DNA fragmentation index (DFI), showing that this new parameter is able to identify low-DFI samples. The present technology measures rheotaxis to determine male in vivo fertility, and can be employed for developing fast point-of-care devices for male fertility quantification as well as DFI. Furthermore, the data implies that the female reproductive tract might use rheotaxis to avoid sperm with fragmented DNA reaching the fertilization site.

BRIEF DESCRIPTION OF THE DRAWINGS

FIG. 7A shows images over time with stars on the images denoting the incidence of head rolling in the sperm head. FIG. 7B illustrates the normalized head intensity over time. Rolling occurs if the normalized head intensity increases over 1 and reduces back.

FIG. 8 illustrates the signal for sperm numbers 1-13 over six experiments along with a power law fit. FIGS. 8B-8F sperm signal with respect to CASA parameters. FIG. 8G illustrates a plot of the power law versus HRF.

FIG. 10A illustrates a linear trend between RHEOLEX and semen motile concentration. FIG. 10B shows RHEOLEX versus flow rate follows an exponential decay with $F^2$. FIG. 10C shows RHEOLEX for various concentrations and flow rates; signal-flow rate-concentration characteristic surface. FIG. 10D illustrates that sperm with velocity less than the rheotaxis velocity ($v_r$) are washed and the rest can swim upstream. FIG. 10E illustrates a VAP distribution. FIG. 10F illustrates a theoretical signal inferred from (f).

FIG. 13A illustrates that DFI shows a descending trend by increasing the SCR. FIG. 13B shows RHEOLEX of various groups of bulls for flow rate of F=2.25, 4.1 and 6.0 μL/h. The dotted lines are 95% confidence intervals. FIGS. 13C-13E show relative RHEOLEX vs. DFI for various flow rates.

DETAILED DESCRIPTION

The present technology relates to methods for evaluating rheotaxis quality in a sperm-containing sample and systems therefor.

One aspect of the present technology relates to a system for quantifying rheotaxis in a sperm-containing sample. The system includes a microfluidic system that includes a housing having a first end and a second end and containing a passage connecting the first and second ends. An inlet is at the first end of said housing for charging fluids into the passage proximate to the first end of said housing and an outlet is at the second end of said housing for discharging fluids from the passage proximate to the second end of said housing, whereby fluid flows from said inlet, through the passage, and into said outlet. One or more probes are within the passage, each of said probes comprising a closed side and a partially open side, wherein the closed side is closer to the first end than the partially open side with the closed side and the partially open side defining between them a confinement region suitable for retaining motile sperm. The system further includes an image processing computing device comprising a non-transitory computer readable medium comprising programmed instructions stored thereon and one or more processors coupled to the computer-readable medium and configured to execute the stored programmed instructions to obtain a sequence of images of the confinement region of at least one of the one or more probes after a sperm-containing sample is injected through the inlet, through the passage, and through the outlet of said microfluidic system at a flow rate, whereby motile sperm are retained within the one or more probes, the one or more probes having said motile sperm retained therein over a period of time. The sequence of images of the confinement region is processed to determine a signal intensity value for said sequence of images, wherein said signal intensity value is based on a concentration of the motile sperm located in the confinement region at the flow rate. A rheotaxis quality value is determined for said sperm-containing sample based on the signal intensity value.

Figure 1:
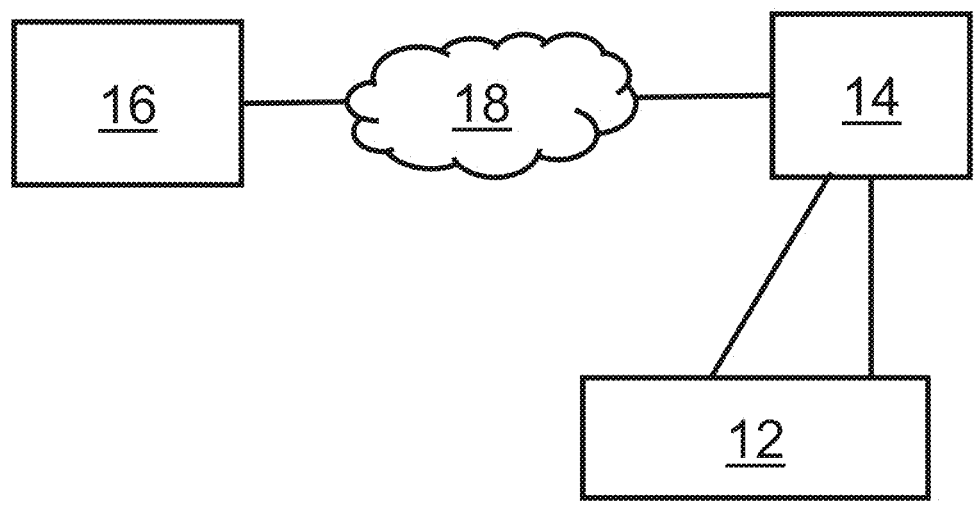
FIG. 1 is a block diagram of an exemplary system for quantifying rheotaxis in a sperm-containing sample of the present technology.

FIG. 1 illustrates an exemplary system 10 of the present technology for quantifying rheotaxis in a sperm-containing sample. In this example, system 10 includes a microfluidic system 12 for retaining motile sperm in a confinement region, an imaging system 14, an image processing computing device 16, and communication network 18, although system 10 can include other types and/or numbers of elements, systems, or devices in other combinations. System 10 advantageously provides for the ability to quantify sperm rheotaxis for evaluating a semen quality. The system provides a rheotaxis quality value (RHEOLEX) that, along with motile sperm concentration, determines sperm fertility levels in natural conception at various shear rates within 5 minutes. The rheotaxis quality value can be employed as a biomarker for determining male in vivo fertility unlike conventional semen quality parameters which fail to provide statistically significant predictions. Moreover, high values for the rheotaxis quality value associates with low DNA fragmentation index (DFI), showing that this new parameter is able to identify low-DFI samples. The system can be employed in fast point-of-care devices for male fertility quantification as well as DFI.

Figures 2A, 2B, 2C:
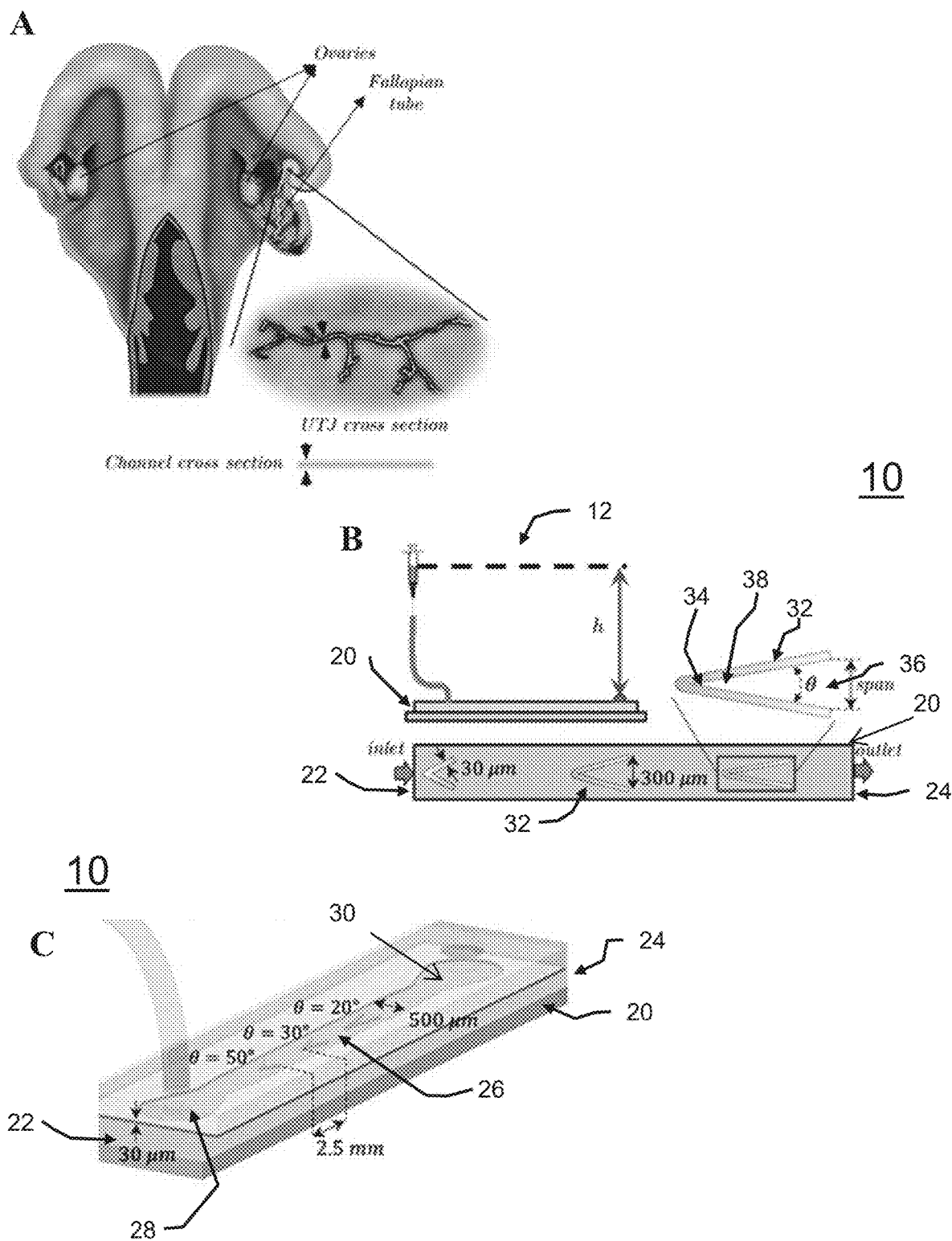
FIG. 2A is an illustration of a female reproductive tract having high aspect ratio microchannels.
FIG. 2B illustrates an exemplary microfluidic system for quantifying rheotaxis in a sperm-containing sample of the present technology.
FIG. 2C is a perspective view of a portion of the microfluidic system illustrated in FIG. 2B.

Referring now to FIGS. 1, 2B, and 2C, the microfluidic system 12 includes housing 20, with first end 22, and second end 24, which are connected by passage 26. Inlet 28 is located a first end 22 for charging fluids into microfluidic system 12. Outlet 30 is located at second end 24 and allows fluid to pass out of microfluidic system 12. Passage 26 permits fluid F to flow from inlet 28 to outlet 30. Passage 26 includes one or more probes 32, with closed side 34 being proximate to inlet 28 and partially open side 36 being proximate to and facing toward outlet 30. One or more probes 32 provide a confinement region 38 for confining motile sperm therein, as described in further detail below. Examples of microfluidic system 12 that may be employed in present technology are described in U.S. Patent Application Publication No. 2019/0308192, which is incorporated herein by reference in its entirety.

Microfluidic system 12 can include a support layer, a substrate layer disposed on the support layer, and any microfluidic circuit described herein with the circuit disposed within the substrate layer. In embodiments, the support layer comprises glass. In embodiments, the substrate layer comprises polydimethylsiloxane (PDMS). In embodiments, a top layer is disposed on the substrate layer. In embodiments, a top layer is disposed on the substrate layer, with the top layer comprising glass.

Microfluidic system 12 can have passage 26 having a width ranging from about 100 μm to 10 mm, a length ranging from about 1000 μm to about 100 mm, and a depth ranging from about 20 μm to 1000 μm, although other dimensions may be employed for passage 26. In one example, inlet 28 and outlet 30 have diameters of about 500 μm.

In one example, microfluidic system 12 mimics the dimensions and hydrodynamic features of the female reproductive tract. The female reproductive tract simultaneously guides and selects high-quality sperm using rheotaxis in mammalian species. FIG. 2A illustrates the female reproductive tract, which contains high aspect ratio channels that can be mimicked using microfluidics of roughly the same dimensions. After intercourse, a robust fluid flow establishes in the female reproductive tract from the oviduct to uterotubal junction (UTJ). The lumen in the UTJ is thin and wide resembling a high aspect ratio channel. Even branches of the main entry can be considered as parallel high aspect ratio channels. In this example, passage 26 of microfluidic system 12 is configured with a depth of about 30 μm to mimic the dimensions of the cervix and UTJ as described in Suarez, et al. "Microfluidic devices for the study of sperm migration," *Mol. Hum. Reprod.* 23:227-34 (2017) and Tung, et al. "Cooperative roles of biological flow and surface topography in guiding sperm migration revealed by a microfluidic model," *Lab Chip* 14:1348-56 (2014), which are incorporated herein by reference in in their entireties, and a width of about 500 μm. In other embodiments, the passage 26 has a height of 40-100 μm. In some embodiments, the passage 26 has a height of 60-80 μm. In one embodiment, passage 26 has a height of 70 μm. As shown in FIGS. 2B and 2C, in this example passage 26 is linear, although in other examples passage 26 could be branched with one or more outlets at the end of each branch.

Probes 32 are located along passage 26. In this example, probes 32 have a V-shaped configuration although other configurations suitable to provide confinement region 38 could be employed. In this example, three probes 32 are illustrated located along passage 26, although microfluidic system 12 could have a single probe or a plurality of probes to provide redundancy of the measurements described herein. In this example, probes 32 are spaced apart along passage 26 by a distance of at least 2.5 mm so that flow becomes fully developed for each of probes 32. Probes 32 may be configured to have corner angles (θ) that may be between 20 degrees and 50 degrees. It has been found that angles above 50 degrees allow sperm to escape confinement region 38. In embodiments, probes 32 have corner angles of 20°, 30°, 40° or 50°. Although FIG. 2C illustrates probes 32 having corner angles of 20, 30, and 50 degrees, respectively, it is to be understood that probes 32 each having the same corner angle could be employed. The side length of the corners of probes 32 are sized such that the span or width at partially open side 36 is about 300 μm across passage 26, which in one example has a width of 500 μm. Probes 32 can have sharp edges 40 located at partially open side 36 to increase residence time in confinement region 38.

Figure 2D:
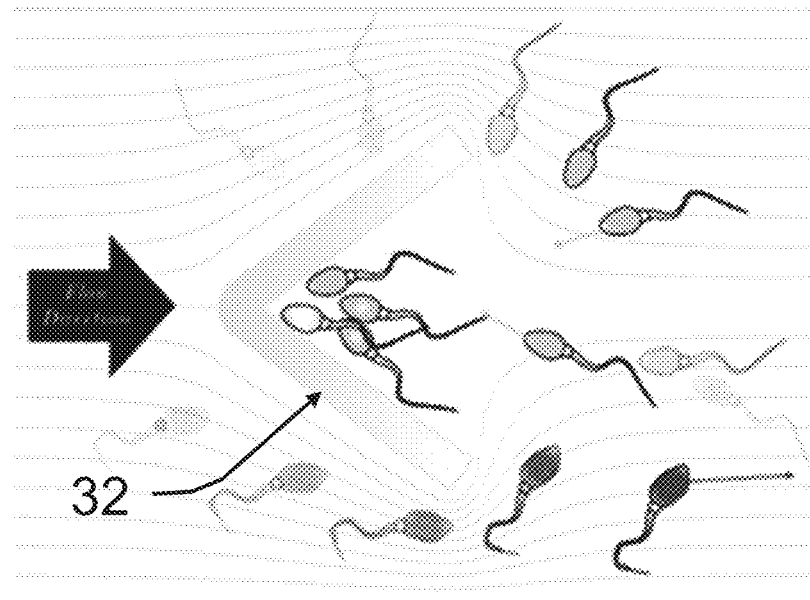
FIG. 2D illustrates an exemplary probe of the microfluidic system of the present technology. Sperm with velocities less than rheotaxis velocity or debris are washed through the microfluidic system and sperm with higher velocities are collected in the probe.
Figure 2E:
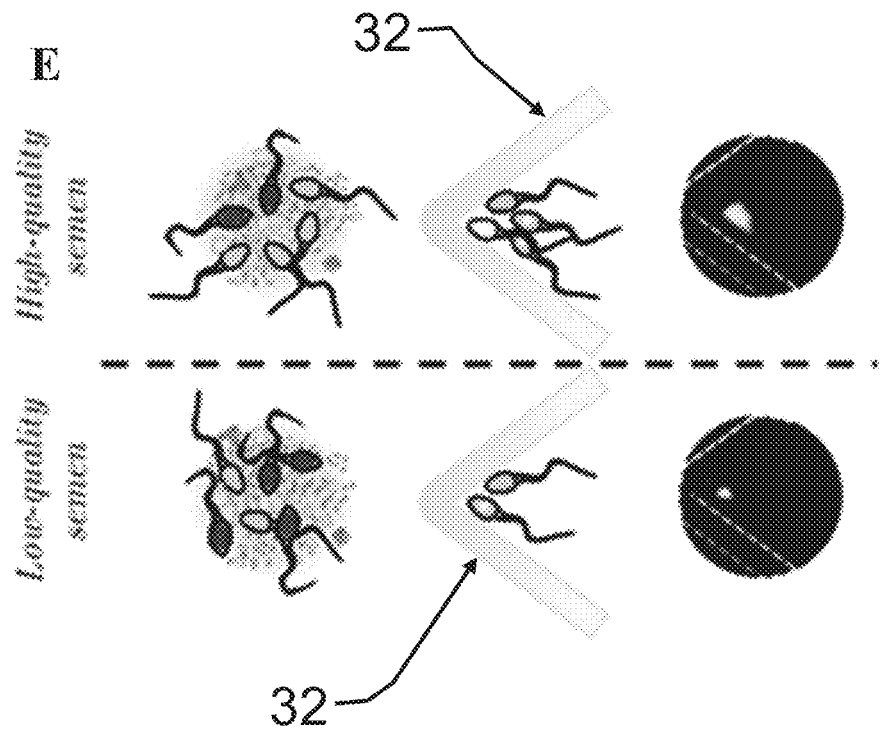
FIG. 2E illustrates a comparison between concentration in an exemplary probe between high-quality and low-quality semen.

Probes 32 are configured and arranged within passage 26 to form a rheotactic region proximate to partially open side 36 of each of the one or more probes 32. As used herein, the terms "rheotactic" and "rheotaxis" refer to the ability of an organism, such as a sperm, to turn and face an oncoming current in a region of fluid flow. As used herein, "rheotactic region" refers to the region in which the flow of a fluid through that region can create rheotaxis in motile sperm. A "motile sperm" is able to move spontaneously and actively. Probes 32 provide a low-shear zone at their span that provides the rheotactic region. The length of the area is chosen so that the velocity and shear rate in the middle line in front of probes 32 ascend to a final value, as described in further detail in the examples set forth below. Sperm that is dragged in this area can reorient and swim against the flow and be collected in confinement region 38 of probes 32. Also, as illustrated in FIG. 2D, sperm from downstream can be collected in probes 32. Sperm with velocities less than rheotaxis velocity or debris are washed to outlet 30 of passage 26, while sperm with higher velocities are collected in probes 32. Referring to FIG. 2E, as the concentration of motile sperm with high rheotaxis velocity increases in a sperm sample, the number of sperm collected in confinement region 38 of probes 32 in a given time period increases accordingly and can be used to evaluate the quality of a semen sample based on the concentration and kinetics of collected sperm. In other words, for semen containing large numbers of high quality sperm with higher velocity, more sperm undergo rheotaxis and are collected in probes 32.

The ability of sperm to swim upstream (Zhang et al., "Human Sperm Rheotaxis: A Passive Physical Process," *Sci Rep* 6:23553 (2016), which is hereby incorporated by reference in its entirety) enables these microswimmers to travel distances over 10,000-times longer than their head-to tail length in order to fertilize an oocyte. This important attribute of sperm results from the hydrodynamic interactions of sperm with walls and the front-back asymmetry of their shape (Tung et al., "Emergence of Upstream Swimming via a Hydrodynamic Transition," *Phys Rev Lett* 114(10):108102 (2015), which is hereby incorporated by reference in its entirety). In the absence of an external fluid flow, sperm locomotion is roughly circular in both right and left-handed modes (Miki et al., "Rheotaxis Guides Mammalian Sperm," *Curr Biol* 23(6):443-452 (2013), which is hereby incorporated by reference in its entirety). However, in the presence of an external fluid flow, different torques exist on the head and tail of the sperm, due to the difference in resistive forces applied to each. This generates a rotation, causing sperm to orient themselves in the opposite direction of the fluid influx. This mechanism is utilized by sperm as a navigational system to track and fertilize the oocytes (Kantsler et al., "Rheotaxis Facilitates Upstream Navigation of Mammalian Sperm Cells," *Elife* 3:e02403 (2014), which is hereby incorporated by reference in its entirety). The upstream swimming, rheotactic behavior of sperm is observed for a discrete shear rate of the surrounding fluid (Miki et al., "Rheotaxis Guides Mammalian Sperm," *Curr Biol* 23(6):443-452 (2013); Tung et al., "Microgrooves and Fluid Flows Provide Preferential Passageways for Sperm Over Pathogen *Tritrichomonas foetus*," *Proc Natl Acad Sci* 112(17):5431-5436 (2015); Zhang et al., "Human Sperm Rheotaxis: A Passive Physical Process," *Sci Rep* 6:23553 (2016), which are hereby incorporated by reference in their entirety). A minimum threshold shear rate for sperm orientation is required, while shear rates above the maximum threshold will prevail over the force produced by the sperm flagellum (Bukatin et al., "Bimodal Rheotactic Behavior Reflects Flagellar Beat Asymmetry in Human Sperm Cells," *Proc Natl Acad Sci* 112(52):15904-15909 (2015), which is hereby incorporated by reference in its entirety). There are some reports suggesting that velocities in the range of 27-110 µm/s for bovines and 22-102 µm/s for humans can lead to sperm rheotaxis (Miki et al., "Rheotaxis Guides Mammalian Sperm," *Curr Biol* 23(6):443-452 (2013); Tung et al., "Emergence of Upstream Swimming via a Hydrodynamic Transition," *Phys Rev Lett* 114(10):108102 (2015); Tung et al., "Microgrooves and Fluid Flows Provide Preferential Passageways for Sperm Over Pathogen *Tritrichomonas Foetus*," *Proc Natl Acad Sci* 112(17):5431-5436 (2015), which are hereby incorporated by reference in their entirety).

Unlike the forces produced by the medium flow, sperm progressive motility that results from the flagellum's propulsive force (Tulsiani, D. ed, *Introduction to Mammalian Reproduction*, Springer Science & Business Media (2012), which is hereby incorporated by reference in its entirety) cannot contribute to its upstream orientation. Once a sperm swims in a shear flow, its head will be closer to the top surface of the probe system where it is barely influenced by the flow, while its tail experiences a greater force. Based on the resistive force theory, the torque resulting from this situation rotates the sperm in the top view plane around its pivot (head). The angular velocity of this rotation (1) can be described by Eq. 1 (Tung et al., "Emergence of Upstream Swimming via a Hydrodynamic Transition," *Phys Rev Lett* 114(10):108102 (2015), which is hereby incorporated by reference in its entirety), $$\Omega = \frac{d\theta}{dt} = -A\gamma \sin \theta \qquad \text{[Equation 1]}$$

in which γ is the shear rate of the sperm medium near the wall (viable sperm mostly swim in the vicinity of the wall) and A is a constant related to the geometry of the microswimmer (Tung et al., "Emergence of Upstream Swimming via a Hydrodynamic Transition," *Phys Rev Lett* 114(10):108102 (2015); Tung et al., "Cooperative Roles of Biological Flow and Surface Topography in Guiding Sperm Migration Revealed by a Microfluidic Model," *Lab Chip* 14(7):1348-1356 (2014), which are hereby incorporated by reference in their entirety). This rotation is temporary and once the sperm finds its consistent orientation (θ=0), it starts swimming upstream with the propulsive force provided by the flagellum (Zöttl et al., "Nonlinear Dynamics of a Microswimmer in Poiseuille Flow," *Phys Rev Lett* 108(21):218104 (2012), which is hereby incorporated by reference in its entirety).

Mathematically sperm are supposed to be dots that can swim with $v_{sperm}$ in the non-flow condition and therefore their trajectories are calculated by solving the ordinary differential equation of lumped particles privileged by a propulsive force of their tails proportional to $v_{sperm}$. Sperm size for bovine and human does not exceed 10 µm and hence they can be carried away by the flow from stagnant state in about 3 µs. Therefore, it is assumed that the sperm velocity is simply the net resultant of fluid velocity and the velocity resulted from the motion of the flagella as shown in Equation 2.

$$\frac{d\vec{r}}{dt} = \vec{v}_{sperm} + \vec{u} \qquad \text{[Equation 2]}$$

$\vec{u}$ in the above equation stands for fluid velocity vector near the top surface and $\vec{v}_{sperm}$ applies the propulsive velocity of sperm and in its direction of movement (θ) and r shows the vector of sperm position with respect to initial position in the domain. Another assumption that will lead to an equation of the sperm's trajectories is that the sperm's average density is equal to density of the fluid otherwise the buoyancy would affect their positions. The initial angle of the sperm entering from between probes 32 was given a normal distribution with the mean 45 degrees and standard deviation of 10 degrees for the lower half of the entering zone and in the opposite direction for the upper half. The velocity of the population of the sperm were also given by normal distribution with 56 µm/s for mean and the standard deviation of 10 µm/s (a normal sperm velocity distribution).

Additionally, as shown in FIG. 2B, microfluidic system 12 can also have a pump 42 positioned to move fluids within passage 26 from the first end 22 of housing 20 to second end 24 of housing 20. One common injection system applicable for use in the present application is a syringe pump (e.g., Chemyx Fusion 200). Pump 42 can be used to control the flow rate of the sperm medium, although any kind of injection systems including micro pumps, syringe pumps, and surface acoustic waves may be used. Different injection rates can be utilized to fine tune the selectivity of the motile sperm that enter confinement region 38. Hydrostatic pressure is used for injection of semen into passage 26 as shown in FIG. 2B. This enables robust generation of biologically relevant mean velocities of 0 to 100 µm/s for the flow rate in passage 26, as described in further detail in the examples below.

In some examples, microfluidic system 12 may also include a heating unit for maintaining microfluidic system 12 at a desired temperature, such as between 25 and 37 degrees Celsius. In addition, microfluidic system 12 may have an incubator where physiological conditions are mimicked. In particular, physiological conditions such as oxygenation, carbon dioxide and/or nitrogen concentrations can be controlled. Other factors such as e.g. humidity may also be controlled. Microfluidic system 12 may also include a separate oxygenator.

Referring again to FIG. 1, system 10 of the present technology also includes imaging system 14 configured to capture a plurality or sequence of images of at least a portion of microfluidic system 12. Imaging system 14 includes a light source configured to illuminate the at least a portion of passage 26 and a detector configured to detect an image, e.g., a shadow image, of the motile cells in the illuminated portion of passage 26.

The integration of microfluidic system 12 with imaging system 14 enables the concentration of sperm in confinement region 38 to be imaged and analyzed. In some embodiments, imaging system 14 includes a light microscope with, e.g., a 10× objective lens. Imaging system 14 includes a light source, such as a light-emitting diode (LED) or other light source. The light source illuminates one or more probes 32 of microfluidic system 12. An image sensor can be placed on the opposite side of microfluidic system 12 from the light source. The image sensor may be any appropriate sensor, such as a charge-coupled device (CCD) sensor or a complementary metal-oxide-semiconductor (CMOS) chip based sensor. Image system 12 could be a fluorescence detector, an optical detector, or a video detector. In one example, imaging system 12 is a digital camera that can obtain a sequence of images or a video.

Imaging system 12 is coupled to image processing computing device 16 by communication network 18. In one example, image processing computing device 16 includes one or more processor(s), a memory, and a communication interface that are coupled together by a bus or other communication link, although the image processing computing device 16 can include other types and/or numbers of elements in other configurations.

In this example, the processor(s) of the image processing computing device may execute programmed instructions stored in the memory for any number of the functions or other operations illustrated and described by way of the examples herein, including obtaining a sequence of images of confinement region 38 of at least one of probes 32 having motile sperm retained therein over a period of time, processing the sequence of images of the region to determine a signal intensity value for the sequence of images, and determining a rheotaxis quality value for the sperm-containing sample based on the signal intensity value, by way of example. The processor(s) of image processing computing device 16 may include one or more CPUs, GPUs, or general processors with one or more processing cores, for example, although other types of processor(s) can be used.

The memory of image processing computing device 16 stores the programmed instructions for one or more aspects of the present technology as illustrated and described herein, although some or all of the programmed instructions could be stored elsewhere. A variety of different types of memory storage devices, such as random access memory (RAM), read only memory (ROM), hard disk drive (HDD), solid state drives (SSD), flash memory, or other computer readable medium that is read from and written to by a magnetic, optical, or other reading and writing system that is coupled to the processor(s) can be used for the memory.

Accordingly, the memory of the image processing computing device can store application(s) that can include executable instructions that, when executed by the image processing computing device, cause the image processing computing device to perform actions, such as obtaining a sequence of images of confinement region 38 of at least one of probes 32 having motile sperm retained therein over a period of time, processing the sequence of images of the region to determine a signal intensity value for the sequence of images, and determining a rheotaxis quality value for the sperm-containing sample based on the signal intensity value, by way of example, as described by way of the examples herein. The application(s) can be implemented as modules or components of other application(s). Further, the application(s) can be implemented as operating system extensions, modules, plugins, or the like.

The communication interface of image processing computing device 16 operatively couples and communicates between image processing computing device 16 and imaging system 12, which are coupled together by one or more communication network(s) 18, although other types and/or numbers of connections and/or configurations to other device and/or elements can be used. By way of example only, communication network(s) 18 can include local area network(s) (LAN(s)) or wide area network(s) (WAN(s)), and/or wireless networks, although other types and/or number of protocols and/or communication network(s) can be used.

Although image processing computing device 16 is illustrated and described in the illustrative examples herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s). In some examples, the devices can be part of a rackmount system.

Portions of all of the examples of the technology illustrated and described herein may also be embodied as one or more non-transitory computer readable media having instructions stored thereon for one or more aspects of the present technology. The instructions in some examples include executable code that when executed by the processor of the image processing computing device, cause the processor to carry out steps necessary to implement the methods of the examples of this technology that are illustrated and described herein.

Another aspect of the present technology relates to method of evaluating rheotaxis quality in a sperm-containing sample. The method includes providing a microfluidic system that includes a housing having a first end and a second end and containing a passage connecting the first and second ends. An inlet is at the first end of said housing for charging fluids into the passage proximate to the first end of said housing and an outlet is at the second end of said housing for discharging fluids from the passage proximate to the second end of said housing, whereby fluid flows from said inlet, through the passage, and into said outlet. One or more probes are within the passage, each of said probes comprising a closed side and a partially open side, wherein the closed side is closer to the first end than the partially open side with the closed side and the partially open side defining between them a confinement region suitable for retaining motile sperm. A sperm-containing sample is injected through the inlet, through the passage, and through the outlet of said microfluidic system at a flow rate, whereby motile sperm are retained within the one or more probes. A sequence of images of the confinement region of at least one of the one or more probes is obtained, by an image processing computing device, the one or more probes having said motile sperm retained therein over a period of time. The sequence of images of the confinement region is processed, by the image processing computing device, to determine a signal intensity value for said sequence of images, wherein said signal intensity value is based on a concentration of the motile sperm located in the confinement region at the flow rate. A rheotaxis quality value is determined, by the image processing computing device, for said sperm-containing sample based on the signal intensity value.

An exemplary method of evaluating rheotaxis quality in a sperm-containing sample will now be described. Microfluidic system 12, such as shown in FIGS. 2B and 2C, is provided. In the use of microfluidic system 12 for evaluating rheotaxis quality in a sperm-containing sample, a sample is first prepared by diluting the sample containing sperm with a chosen buffer, such as Tyrode's albumin lactate pyruvate (TALP) medium. The sample is then loaded or injected into microfluidic system 12 through inlet 28 located on first end 22, through passage 26, and through outlet 30 located on second end 24. In some examples, pump 42, such as a syringe pump, may be used to move a biocompatible medium/buffer from inlet 28 to outlet 30, located on second end 24, via passage 26. The flow rate of the medium/sample should be adjusted to acquire the desired rheotaxis parameters. This can be accomplished by adjusting the flow rate of pump 42. During the flow of the sample through passage 26 to outlet 30 the motile sperm will enter probes 32 and are retained therein, as described above. The sperm in probes 32 can be imaged by imaging system 14 to obtain a plurality or sequence of images.

Figures 3A, 3B:
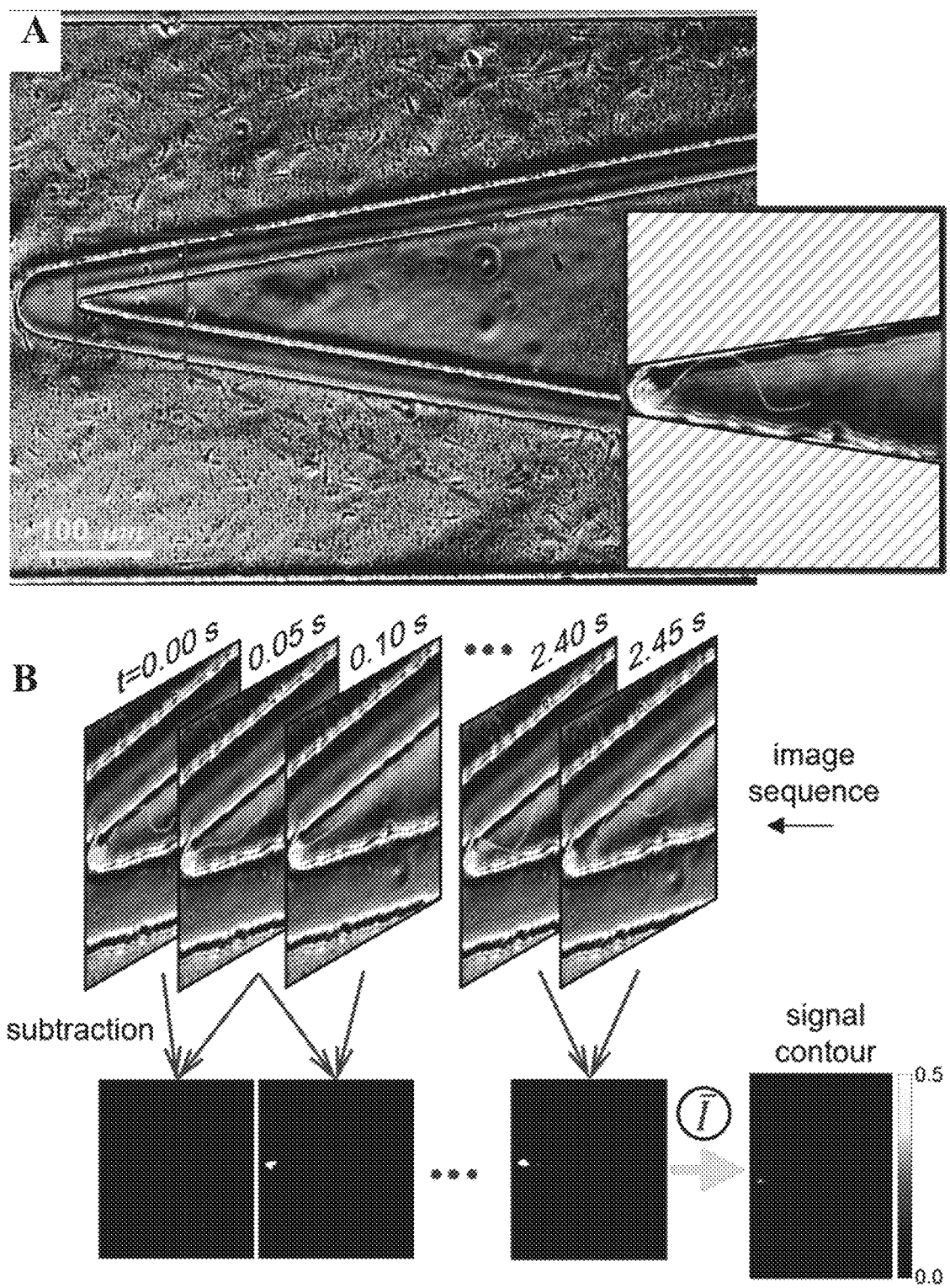
FIG. 3A illustrates an imaged portion of the microfluidic system having trapped sperm in a confinement region of the microfluidic system of the present technology.
FIG. 3B illustrates a sequence of images of the imaged portion shown in FIG. 3B and an exemplary processing of those images.

A sequence of images of confinement region 38 of at least one of the one or more probes 32 is captured by imaging system 14 over a period of time, although the sequence of images could be captured by other imaging devices. In other examples, multiple confinement regions 38 may be imaged to provide for redundancy in the testing. As shown in FIG. 3A, a portion of confinement region 38 containing trapped motile sperm is selected for imaging. In one example, areas outside the selected region may be covered to avoid the effect of those areas on the imaging as shown in the inset portion of FIG. 3A. For example, a mask may be employed for the areas outside of the image portion to avoid noise in the signal obtained during the imaging sequence. In one example, the sequence of images is obtained after the motile sperm has been retained in confinement region for at least five minutes. In one example, at least fifty images of confinement region 38 are acquired as part of the sequence of images. The sequence of images may be part of a video obtained of confinement region.

Imaging processing computing device 16 obtains the sequence of images, for example, from imaging system 14. Next, image processing computing device 16 processes the sequence of images of confinement region 38 to determine a signal intensity value that is based on the concentration of motile sperm located in confinement region 38 at the flow rate. The plurality of images are processed to "virtually stain" the sperm movement in probe 32 to estimate the number of sperm there.

As part of the processing, as illustrated in FIG. 3B, consecutive images in the sequence of images are subtracted from each other to highlight the intensity change in various pixels. This intensity change shows if there is any movement in the region where the intensity is high. Then the differenced images are averaged over the sequence of images. In one example, where 50 images are obtained, the subtracted images are averaged over a 49 image period. The resultant average image intensity then is rescaled to put the maximum signal intensity value as the mean intensity value of difference for demonstration of the signal contour. This mean value is referred to herein as the signal (S). Signal (S) is based on the intensity of the pixels and has arbitrary units.

Figures 3C, 3D, 3E:
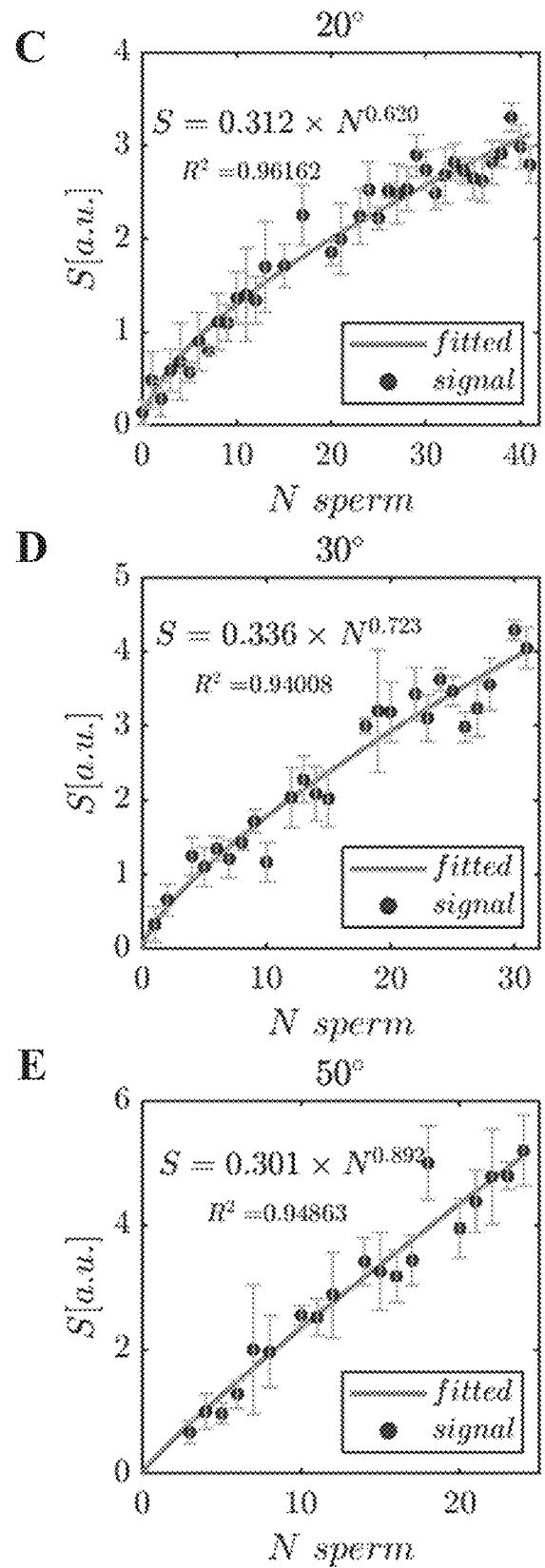
FIGS. 3C-3E illustrate signals obtained for 20 degree (FIG. 3C), 30 degree (FIG. 3D), and 50 degree (FIG. 3E) probes. Fitting parameters and the regression coefficient of determination are displayed for each case. Error bars are for n greater than 3.

FIGS. 3C-3E illustrate experimental data in which different numbers of sperm were injected to a microfluidic system having probes of 20, 30, and 50 degrees. For this experiment there was not any flow in the passage and the number of incoming sperm to the probe were counted over time and the signal was calculated for every 50 frames. The resulting signal (S) was measured for each of the probes in accordance with the methods described herein. As described in further detail in the examples below, there is a consistent correlation between signal (S) and number of sperm in each of the probes. Thus, signal (S) can be used to differentiate the number of sperm that have undergone rheotaxis and have been collected in the probes. This method can then distinguish the number of motile sperm with a velocity more than the mean rheotaxis velocity (V r) in the rheotaxis-zone in front of the probe, as described in further detail below. As shown in FIGS. 3C-3E there is a power law correlation between signal (S) and the number of sperm trapped in the confinement region of the probe as given by Equation 3.

$$S = A \cdot N^b \quad \text{[Equation 3]}$$

in which A and b are constant and N is the number of sperm in the probe. As the number of sperm increases there is a more chance that the heads of the sperm in the corner, or confinement region, overlap causing the signal (S) to increase less than when the heads do not overlap. Therefore, the signal (S) increases as the corner angle increases for the same number of sperm. There is no saturation point for the signal-number curve. Using the least-square fitting, the coefficient A and the power b for each case are calculated as shown in FIGS. 3C-3E, which show that b is a parameter solely dependent on the angle of the probe and A is a constant.

Existence of the corner in the middle of the flow creates a low and a high shear zone and a rheotaxis zone. Once sperm swim or is dragged in the rheotaxis zone and reorient upstream, the sperm will swim and be collected in the corner, or confinement region, of the probe. The number in the corner is a function of the flowrate and concentration of the motile sperm in the sample.

Figure 4A:
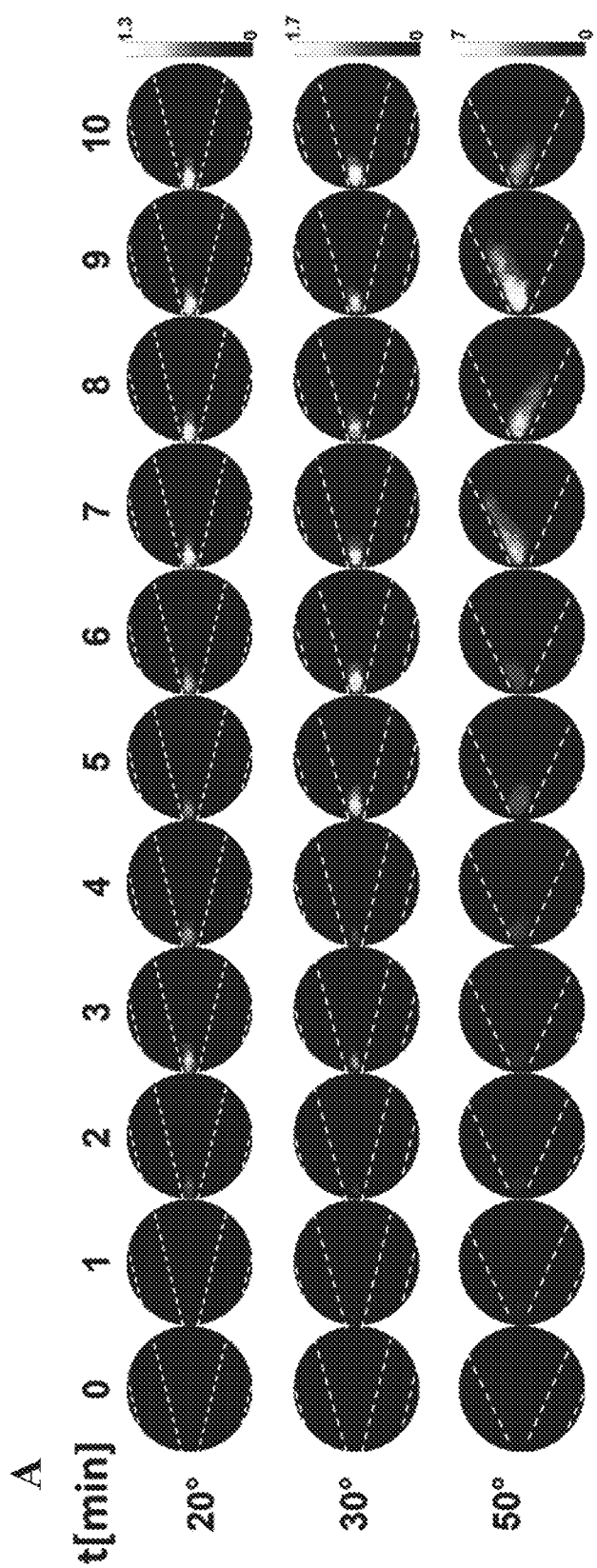
FIG. 4A illustrates the contours of averaged signals from t=0 to 10 minutes for three different corner angles.
Figures 4B, 4C, 4D:
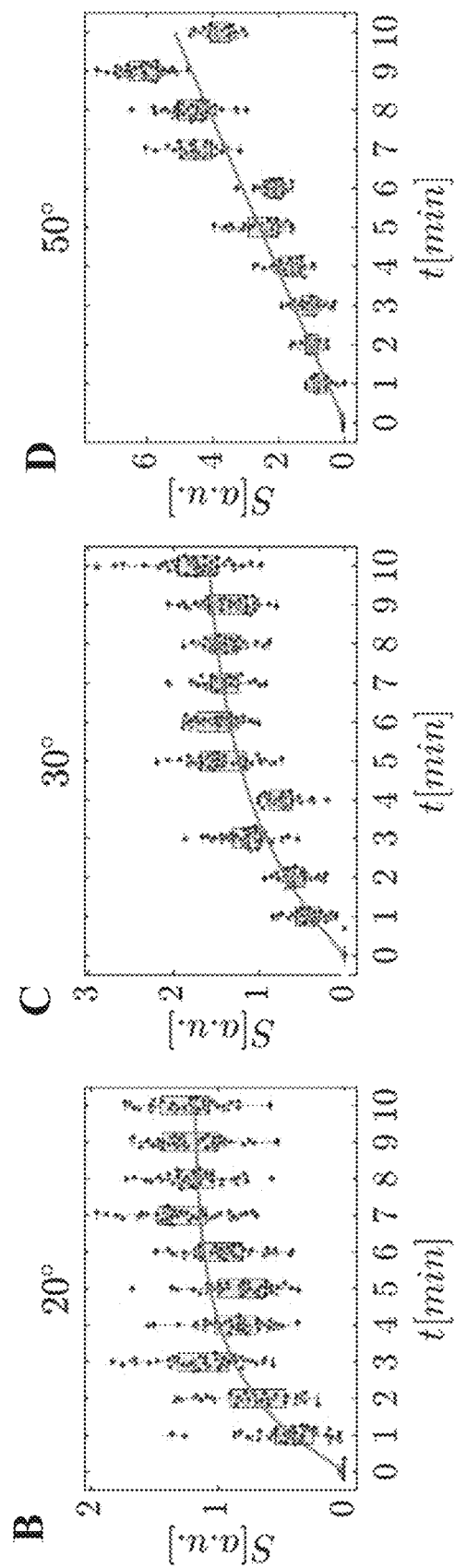
FIGS. 4B-4D are graphs illustrating whiskers of the signal for intervals of 1 minute for 20° (FIG. 4B), 30° (FIG. 4C), and 50° (FIG. 4D) corner angles. An exponential function $S=p(1-e^{-qt})$ is fitted to each figure to show that at t=5 min the signal reaches more than 80% of the final value for 20° and 30°.

FIGS. 4A-4D illustrate the contours and signal for a sample of concentration C=2.04M/mL and flow rate of F=3.95 µL/h for probe angles of 20, 30, and 50 degrees. Each point in the whiskers is related to one signal and all data points were averaged over a 49-image period for each time interval. Although the signal-number curve does not have a saturation point, the rate of the number of sperm that undergo rheotaxis and are collected in the corner reduces overtime and the signal reaches a maximum point after which it does not change for angle 20 and 30° as shown in FIGS. 4B and 4C, respectively. For 50°, on the other hand, as shown in FIG. 4D, the signal increases up to the 9th minute but reduces after that. This is because the acute angles provide a higher chance of sperm remaining in the probe whereas for angles higher than 50°, sperm can be discharged from the probe.

Presence of sperm in the corner and beating of their tails deviate the incoming sperm to reach the corner. Once a sperm is deviated from the corner it will be forced to one of the corner walls and be directed again to the corner. In the case of the 50° probe, as shown in FIG. 4D, the deviated sperm might reach the corner walls with an incident angle that will lead the sperm away from the corner. In the case of higher corner angles collected sperm have more freedom of motion that makes it more probable for them to be detached and swim away back to the main flow stream, as described in the examples set forth below.

A simple comparison between the signal (s) of different probe angles in FIGS. 4B-4D and their signal-number curves in FIGS. 3C-3E reveals that the predicted number of sperm in the probes are approximately the same for the 20 and 30° examples. For example, in the 5th minute, the average predicted sperm numbers for 20, 30 and 50° angles are 7, 8, and 10 respectively.

Next, the image processing computing device 16 determines a rheotaxis quality value based on the signal intensity value (S), as described in the examples set forth below. The rheotaxis quality value is correlated to and can be used to determine an in vivo fertility level for the sperm-containing sample. In other examples, the rheotaxis quality value is correlated to and can be used to determine a DNA fragmentation index (DFI) value for the sperm-containing sample. For example, determining the DFI value may include determining the concentration of motile sperm located in the confinement region based on the rheotaxis quality value. The rheotaxis quality value can then be divided by the concentration to remove concentration dependence. The DFI value is then determined based on the concentration independent value. For example, correlations between the rheotaxis quality value and in vivo fertility and DFI value can be provided in a look up table on the image processing computing device 16, although other methods may be employed.

The examples below are intended to exemplify the practice of embodiments of the disclosure but are by no means intended to limit the scope thereof.

Example 1—Materials and Methods

To evaluate the fertilization ability of mammalian sperm beyond common motility parameters, a microfluidic platform mimicking the structure of lumen in the UTJ, which collects sperm based on their rheotactic velocities in probes at various flow rates, was developed. An image processing technique was also developed that can virtually stain the motility of sperm trapped in a corner probe as a signal. It is utilized to characterize the number of sperm that are collected in 5 minutes. Compared to CASA, which tracks 200 sperm for sperm analysis corresponding to 0.01 µL of a typical semen, this method evaluates up to 0.5 µL of semen sample, which improves the statistical significance of the represented data. This signal is shown to be positively associated with the fertilization level of the males.

Microfluidic Device: A device as illustrated in FIG. 2A was utilized in the experiments. The device has three probes with corner angles of 20°, 30° and 50° in order to collect sperm swimming upstream to characterize rheotaxis. The side length of the corners are chosen so that the span of the different corners becomes equal to 300 µm in the channel of 500 µm width. The depth of the channel is chosen equal to 30 µm to mimic the dimension of cervix and UTJ. Suarez, et al. "Microfluidic devices for the study of sperm migration," *Mol. Hum. Reprod.* 23:227-34 (2017) and Tung, et al. "Cooperative roles of biological flow and surface topography in guiding sperm migration revealed by a microfluidic model," *Lab Chip* 14:1348-56 (2014). The distance between the probes is chosen 2.5 mm so that flow becomes fully developed for the probes downstream.

Device fabrication: The microfluidic chips were made of SU-8 and photolithography and poured PDMS on the resulting mold as in conventional soft lithography.

Sample flow rate: To inject the sample into the device, hydrostatic pressure was used as illustrated in the experimental set-up illustrated in FIGS. 5A and 5B. A reservoir of sample was kept on a level and the height of the level was set with respect to the microscope stage. For a certain flow rate, the height was controlled accordingly and because of this, the syringe type, tubing length and type and outlet reservoir were kept constant to provide a consistent flow rate. The reported flow rates were calculated using the Particle Image Velocimetry (PIV) module of MATLAB R21a. Thielicke, et al. "PIVlab—towards user-friendly, affordable and accurate digital particle image velocimetry in MATLAB." Journal of open research software [Internet] 2 (2014).

Figures 5A, 5B, 5C:
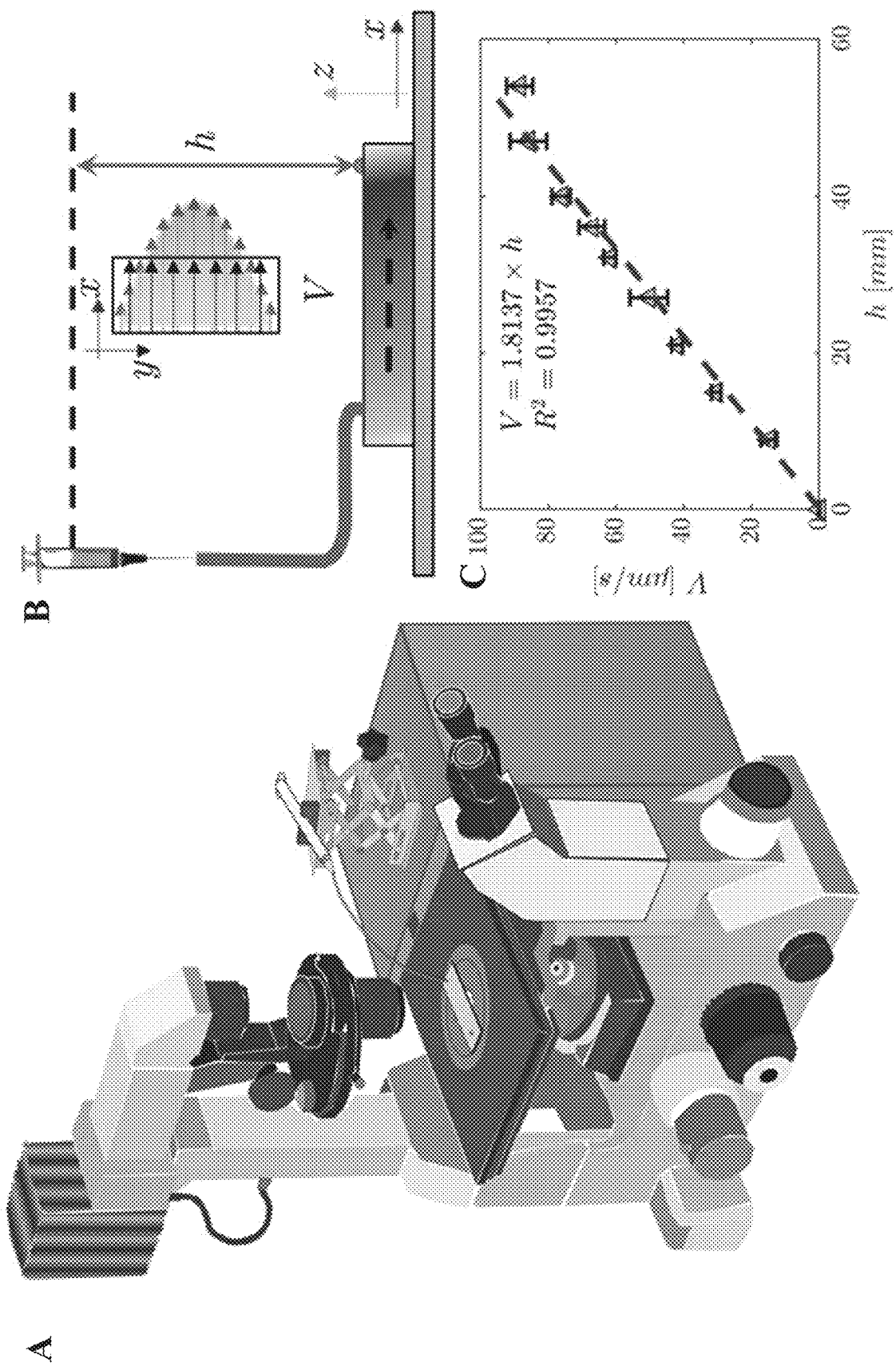
FIGS. 5A and 5B illustrate an image and schematic of the experimental setup for an exemplary system for quantifying rheotaxis in a sperm-containing sample of the present technology for flow rate injection into a microchannel using hydrostatic pressure.
FIG. 5C is a graph illustrating a linear relationship between mean velocity in cross-section of the channel and the height of the syringe in the biologically relevant velocities for the experimental set-up illustrated in FIGS. 5A and 5B.

PIV analysis of the egg-yolk particles in the channel with 20 frames per second was used to show that as the height (h) of the injection reservoir increases, mean velocity (V) in the cross section of the channel increases linearly as shown in FIG. 5C. This enables robust generation of biologically relevant mean velocities of 0 to 100 µm/s in this microchannel.

Figure 6A:
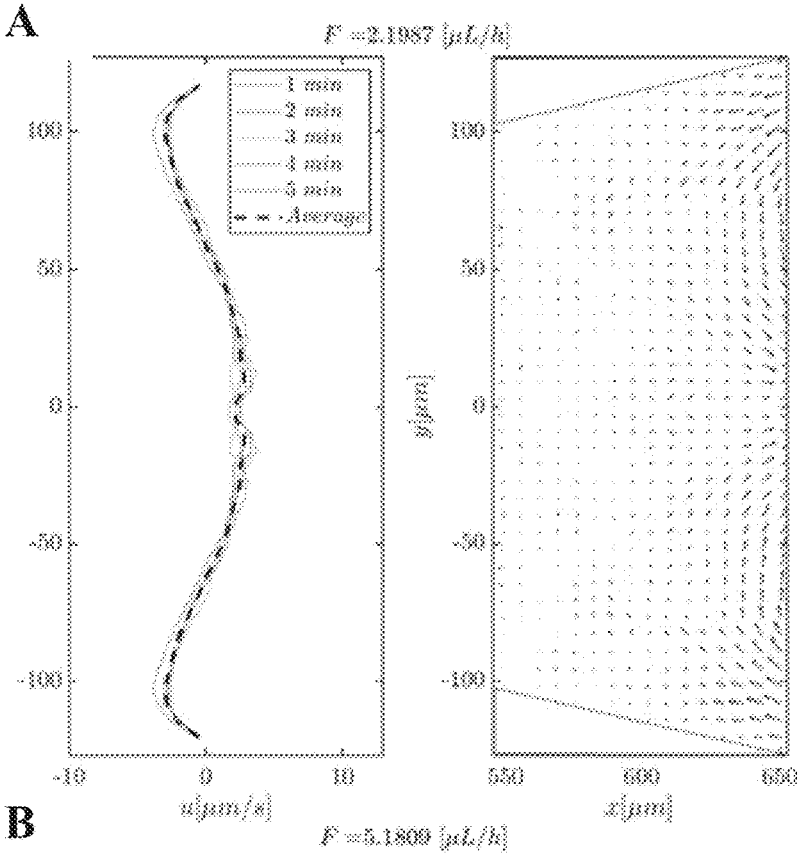
FIGS. 6A-6C illustrate experimental measurements of velocity vectors and the x-component of velocity on the line of x=650μ related to PIV of the egg-yolk particles at the span of the 20 degree probe for the experimental set-up illustrated in FIGS. 5A and 5B for different flow rates.
Figure 6B:
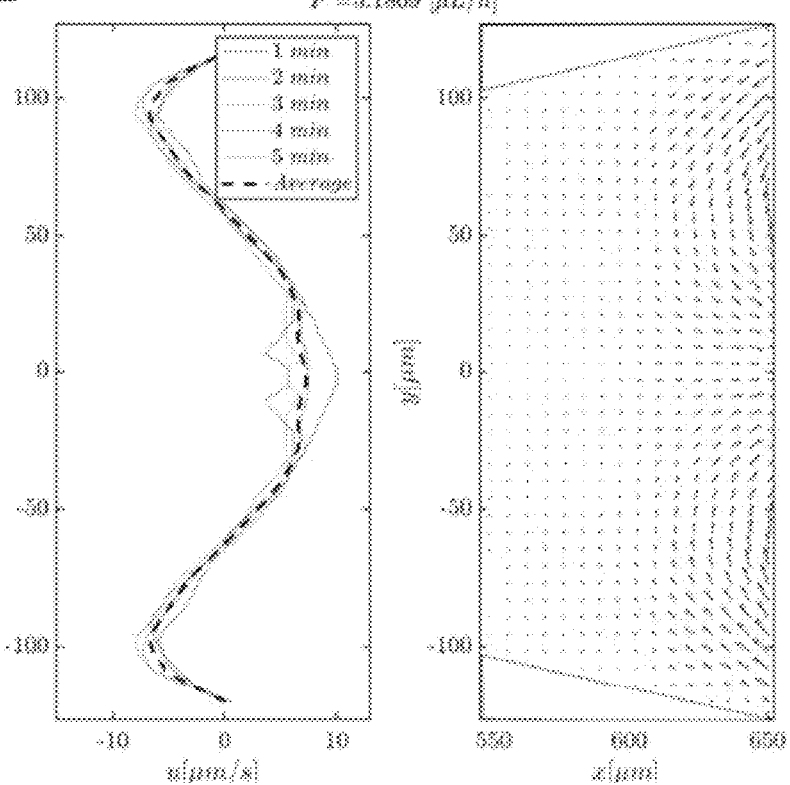
Figure 6C:
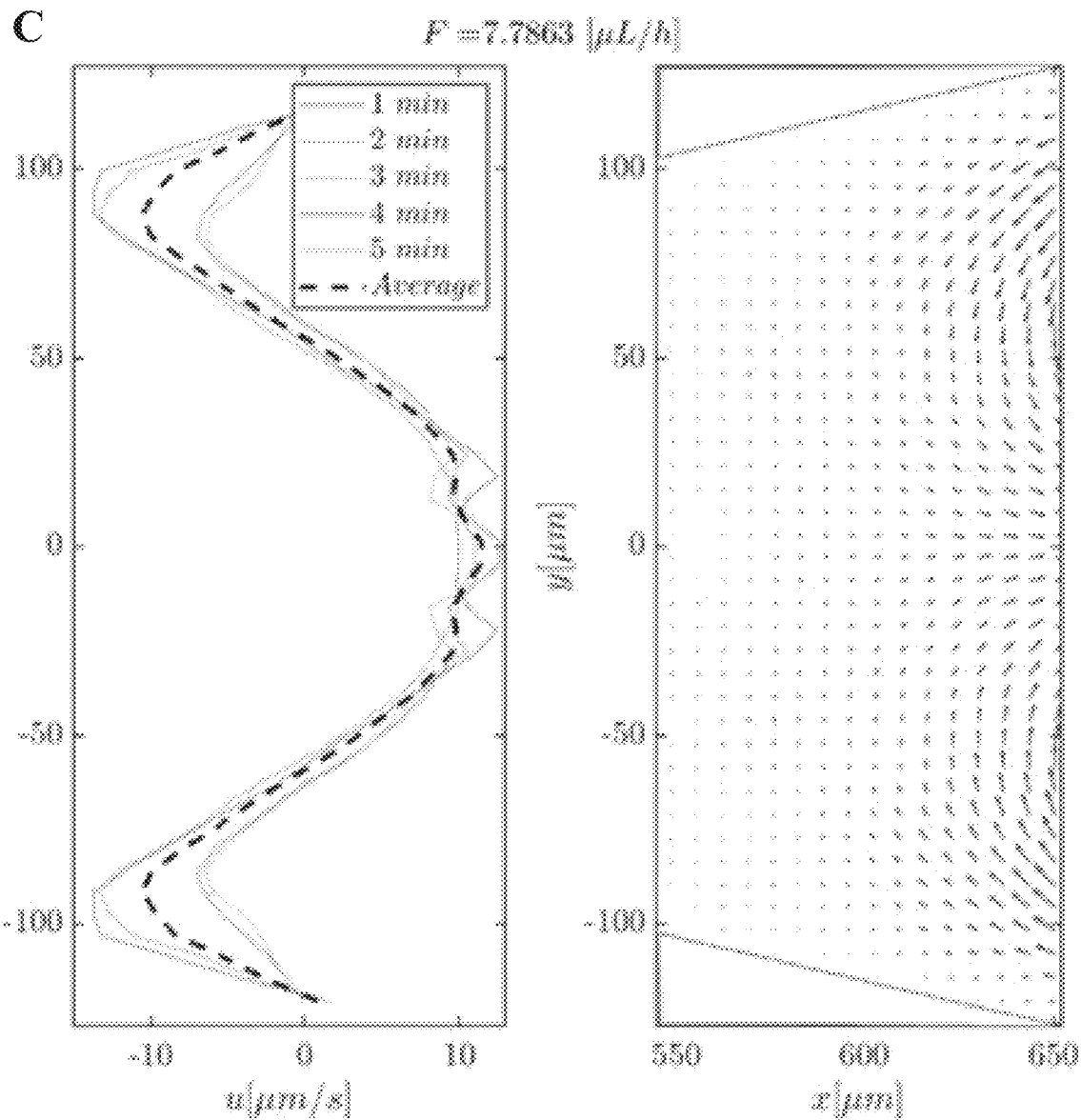
Figure 6D:
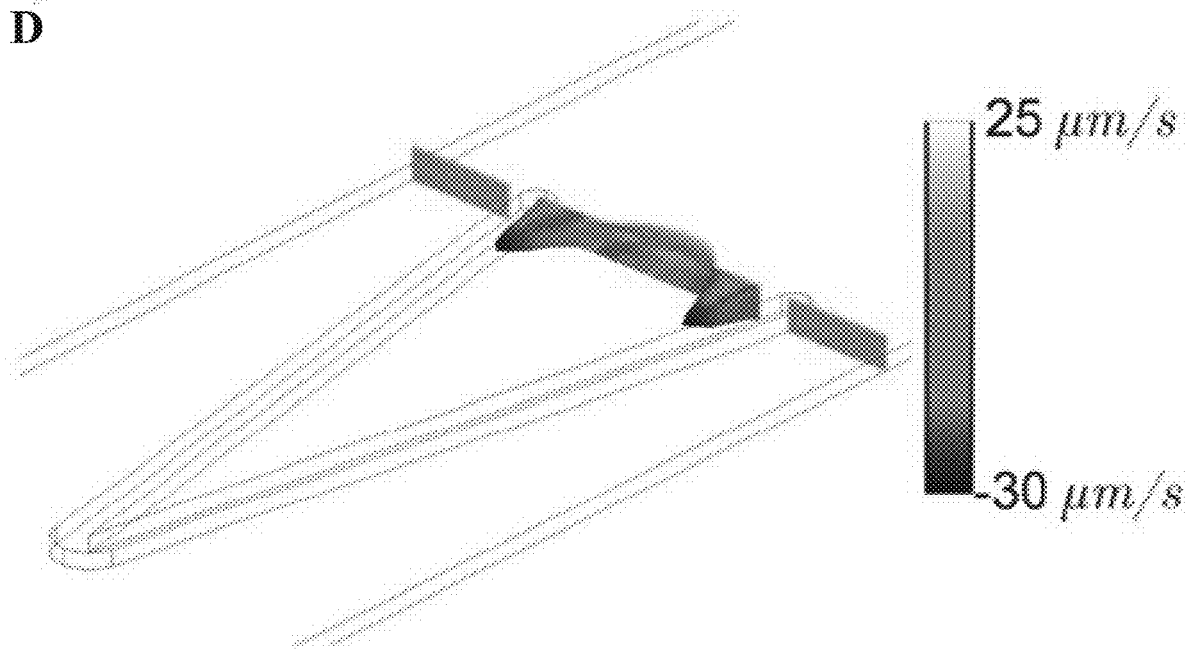
FIGS. 6D-6G illustrate simulation results of FEM analysis for the velocity profile at the span of the probe related to the results shown in FIGS. 6A-6C, respectively.
Figure 6E:
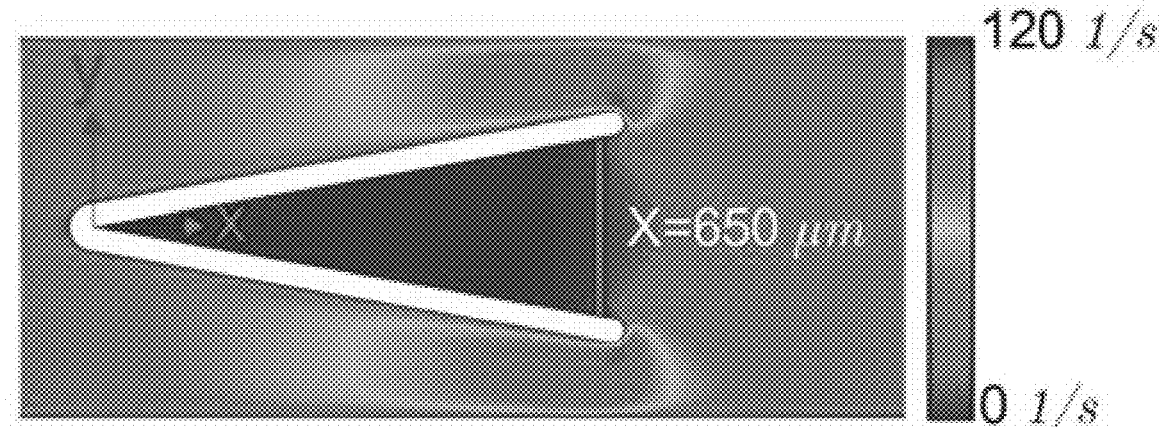
Figure 6F:
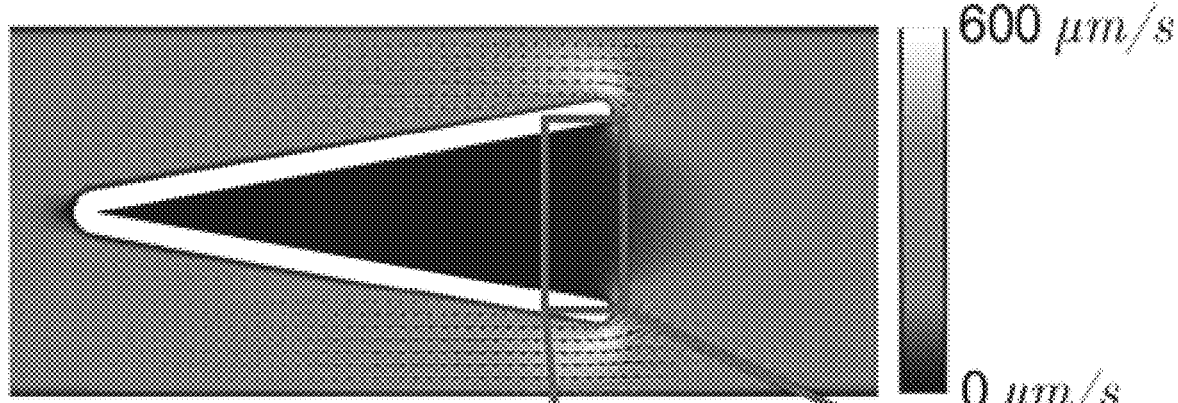

Since 50 frames were captured for evaluation of the signal, 50 images were fed into PIVlab code and a rectangular area of width 100 µm and height 300 µm was chosen with the right side coinciding with X=650 µm (corner of the probe was chosen as origin in FIG. 6E). Using the difference of consecutive images, PIVlab resulted in 49 flow fields which were averaged to calculate the experimental velocity field at the span of the probe.

Figure 6G:
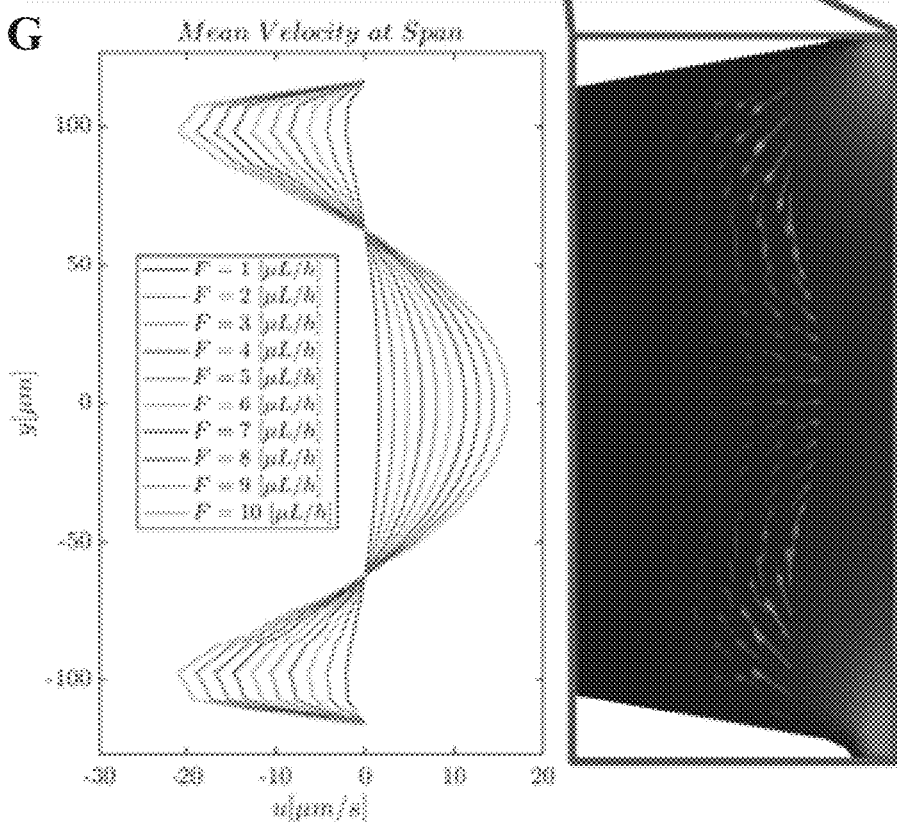

For evaluation of flow rate in the channel within the same video captured for signal, the fact that velocity profile in Newtonian fluids is linearly affected by the flow rate was used. The mean velocity profile was measured at the probe span (on the line of X=650 µm as depicted in FIG. 6E) and then compared the experimental velocity profile to the theoretical velocity profile extracted from the FEM simulations (FIG. 6G). The comparison was performed using the least squares algorithm. Taking $u_t(F,y)$ as the theoretical velocity profile and $u(y)$ as the experimental velocity profile, the following expression was calculated for g(F) from F=1 to 10 µL/h and linear interpolation was used to find F for which g(F)=0.

$$g(F)=\Sigma_y(u_t(F,y)-u(y))^2 \qquad \text{[Equation 4]}$$

Where $\Sigma_y$ means sum over y.

Medium: The sperm samples were diluted by Tyrode's albumin lactate pyruvate (TALP). TALP contained NaCl (110 mM), KCl (2.68 mM), $NaH_2PO_4$ (0.36 mM), $NaHCO_3$ (25 mM), $MgCl_2$ (0.49 mM), $CaCl_2$ (2.4 mM), HEPES buffer (25 mM), glucose (5.56 mM), pyruvic acid (1.0 mM), penicillin G (0.006% or 3 mg/500 mL), and bovine serum albumin (20 mg/mL) in 500 mL DI water (pH=7.4).

Sperm samples: Frozen straws of bovine (Holstein) semen in egg-yolk extender were thawed by immersing them in a water bath at 37° C. for 30-45 seconds immediately after being retrieved from a liquid nitrogen tank. Fresh medium at 37° C. was then added to the samples. For fertility analysis, 16 bulls were chosen based on their SCR value in the range of −3 to +3 at the time of purchase. Two units (200 µL) of each bull were purchased from the GENEX corporation, and diluted three times by addition of 400 µL medium and the tests were performed on these samples. Hence, the concentrations of the semen in Table 1 shown below is one-third of the concentrations of the samples in the units. Table 1 illustrates data for the signal, flow rates, and concentrations used for linear model of bull fertility.

| Concentration [M/mL] | Height 20 mm (N = 3) | Height 40 mm (N = 3) | Height 60 mm (N = 3) |
|---|---|---|---|
| SCR = 2.80 conc = 1.87 | | | |
| Flow rate [µL/h] | 1.87 (0.13) | 4.52 (0.12) | 5.30 (0.14) |
| Signal [a.u.] | 2.25 (0.50) | 0.30 (0.17) | 0.23 (0.06) |
| SCR = 2.50 conc = 3.04 | | | |
| Flow rate [µL/h] | 2.54 (0.06) | 5.25 (0.04) | 5.84 (0.65) |
| Signal [a.u.] | 2.48 (0.48) | 1.22 (0.68) | 1.01 (0.29) |
| SCR = −1.90 conc = 2.46 | | | |
| Flow rate [µL/h] | 2.34 (0.23) | 4.31 (0.40) | 5.51 (0.32) |
| Signal [a.u.] | 5.84 (1.45) | 1.94 (0.15) | 1.31 (0.45) |
| SCR = −2.40 conc = 1.50 | | | |
| Flow rate [µL/h] | 1.88 (0.08) | 2.31 (0.23) | 6.03 (0.44) |
| Signal [a.u.] | 0.85 (0.07) | 0.44 (0.15) | 0.22 (0.13) |
| SCR = 0.40 conc = 1.62 | | | |
| Flow rate [µL/h] | 1.99 (0.10) | 2.64 (0.16) | 4.20 (0.11) |
| Signal [a.u.] | 2.06 (0.82) | 0.79 (0.36) | 0.40 (0.25) |
| SCR = 0.80 conc = 0.74 | | | |
| Flow rate [µL/h] | 3.00 (0.45) | 5.70 (0.67) | 6.72 (0.31) |
| Signal [a.u.] | 1.43 (0.17) | 0.50 (0.23) | 0.45 (0.31) |
| SCR = −0.50 conc = 5.01 | | | |
| Flow rate [µL/h] | 1.89 (0.26) | 4.77 (0.11) | 5.58 (0.27) |
| Signal [a.u.] | 4.28 (0.70) | 1.18 (0.45) | 0.50 (0.34) |
| SCR = 1.00 conc = 2.74 | | | |
| Flow rate [µL/h] | 2.30 (0.26) | 3.74 (0.24) | 8.23 (0.73) |
| Signal [a.u.] | 2.02 (0.97) | 1.19 (0.24) | 0.96 (0.10) |
| SCR = 1.80 conc = 3.40 | | | |
| Flow rate [µL/h] | 2.30 (0.26) | 4.28 (0.11) | 5.60 (0.27) |
| Signal [a.u.] | 2.66 (1.54) | 1.21 (0.59) | 0.81 (0.20) |
| SCR = −0.40 conc = 1.30 | | | |
| Flow rate [µL/h] | 2.79 (0.23) | 3.80 (0.23) | 6.00 (0.53) |
| Signal [a.u.] | 2.13 (0.63) | 1.25 (0.52) | 0.76 (0.24) |
| SCR = 0.30 conc = 0.92 | | | |
| Flow rate [µL/h] | 3.05 (0.64) | 4.46 (0.15) | 8.13 (0.43) |
| Signal [a.u.] | 2.24 (0.32) | 0.60 (0.12) | 0.23 (0.19) |
| SCR = −0.30 conc = 1.52 | | | |
| Flow rate [µL/h] | 2.92 (0.42) | 4.02 (0.18) | 5.09 (0.04) |
| Signal [a.u.] | 1.83 (0.21) | 1.22 (0.13) | 0.86 (0.30) |
| SCR = −1.40 conc = 1.27 | | | |
| Flow rate [µL/h] | 2.56 (0.30) | 3.74 (0.26) | 3.99 (0.12) |
| Signal [a.u.] | 0.58 (0.23) | 0.33 (0.08) | 0.30 (0.11) |
| SCR = 2.40 conc = 2.01 | | | |
| Flow rate [µL/h] | 2.10 (0.15) | 4.01 (0.08) | 7.15 (0.19) |
| Signal [a.u.] | 1.61 (0.69) | 0.61 (0.33) | 0.11 (0.11) |
| SCR = 2.60 conc = 1.10 | | | |
| Flow rate [µL/h] | 1.87 (0.29) | 4.79 (0.60) | 6.55 (0.91) |
| Signal [a.u.] | 3.45 (0.90) | 1.35 (0.54) | 0.63 (0.28) |
| SCR = −0.40 conc = 1.97 | | | |
| Flow rate [µL/h] | 1.04 (0.1) | 3.33 (0.06) | 6.07 (0.39) |
| Signal [a.u.] | 1.63 (0.25) | 1.27 (0.29) | 0.71 (0.36) |

Microscope setup and Camera: A Nikon eclipse TE300 phase-contrast microscope was used to visualize the movement of the sperm in the channels. Movie recordings were acquired at 60, and 20 frames per second with a 20× objective. An Andor Zyla 4.2 digital camera was used for capturing the movies. All the images were in 2048 by 2048 pixel resolution and 16 bit data type (so that the maximum intensity is $2^{16}-1=65353$). For CASA measurements a Leica DMill inverted microscope was used on which a phantom high speed camera was mounted.

Numerical simulations: Simulations were performed in COMSOL Multiphysics 5.4a for calculating the velocity field and shear rate.

CASA measurements: 10 µL of diluted sample were diluted two times by addition of 10 µL medium. 4 µL of the resulting sample was transferred to a 30 µm depth chip. 3 movies were taken to ensure capturing enough motile sperm from 3 fields. Sperm head locations were determined using ImageJ (version 1.52a; NIH), manual tracking module, and the trajectories of the sperm were analyzed by MATLAB R21a. VAP, VSL, VCL, ALH, and BCF measurements were performed on sperm in a microfluidics chip with 30 µm depth to avoid the effects of channel height on sperm velocity. The method of extracting CASA parameters is implemented based on formulation from Gallagher, et al. "Rapid sperm capture: high-throughput flagellar waveform analysis," Hum. Reprod. 34:1173-85 (2019), which is incorporated herein by reference in its entirety.

Statistics: Each experiment was repeated at least three times and values were reported as mean followed by standard deviation in parentheses. A linear regression model, with RHEOLEX as the response variable and flow rate, concentration and SCR as explanatory variables, was fit to assess the relationship between RHEOLEX and SCR. A random slope of bull was included to allow the relationship between RHEOLEX and flow rate to vary by bull. Visual techniques were used to assess the normality of the residuals, such as histograms and boxplots. The following transforms of the response variable were investigated in an effort to improve the normality of the residuals: square root, cube root, $1-1/(1+\exp(S))$ and $-\sqrt{-\ln(S/max)}$ where max was the largest RHEOLEX observed. Significance was determined at the 5% level. All the statistical analysis was performed in STATA 17.0.

Signal of single sperm in relation to CASA: A sample of concentration 0.01 M/mL was produced and was used at the inlet. Flow rate in the main channel was set to 1 µL/h to ensure that any motile sperm with VAP>20 µm/s can be collected and the span in front of the corner was monitored. Once a sperm approached the corner and passed the span, the flow rate was immediately increased to ~50 µL/h to ensure no more sperm enters the corner. A video was recorded to measure CASA parameters and after sperm reached the corner, a video was recorded to measure the signal. At the end of this video recording, which takes about ~15 seconds, flow rate was reduced to 1ilt/h to repeat the process 78 times up to 13 sperm in the corner at each of the 6 trials.

Example 2—CASA and Signal at Single Cell Level

Figure 7A:
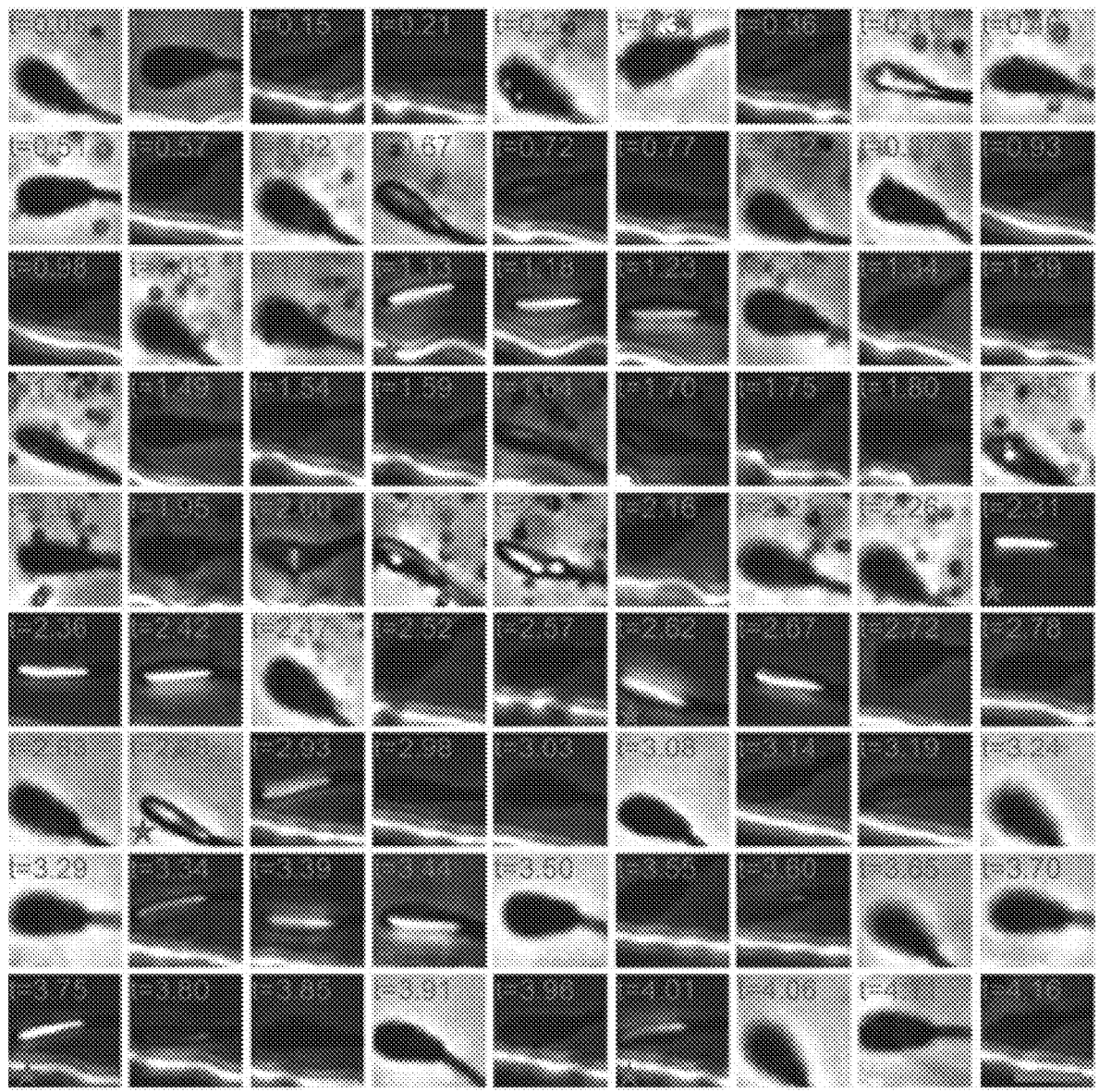
FIGS. 7A and 7B illustrate head rolling frequency (HRF) measurements based on the intensity of the head while sperm tracking.
Figure 7B:
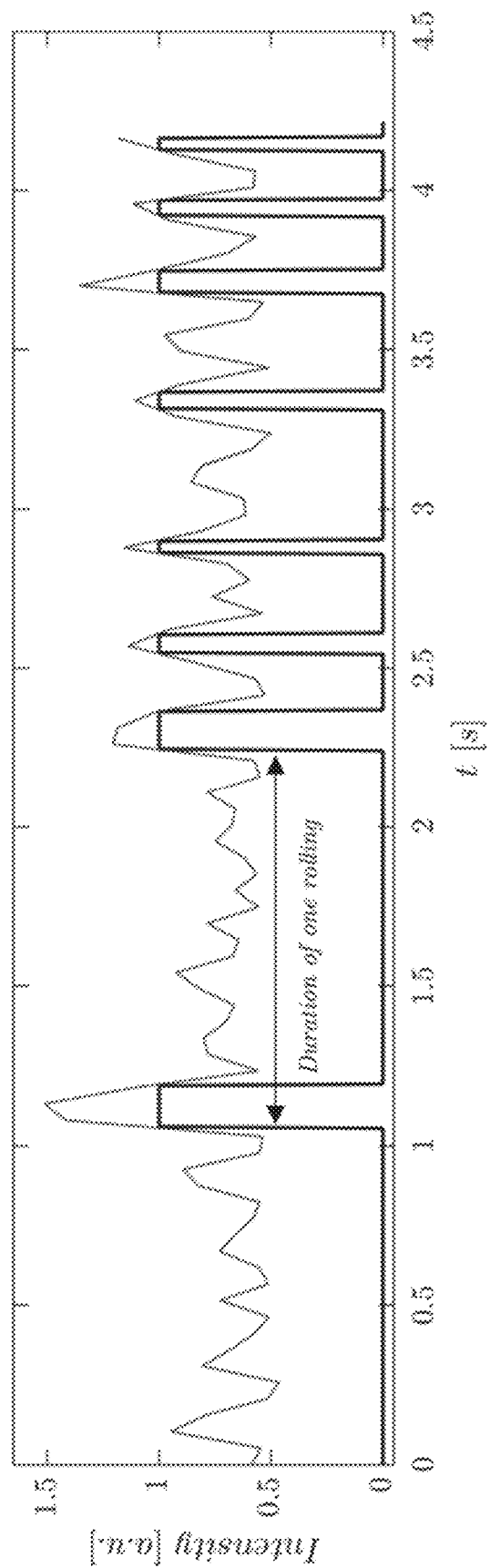

RHEOLEX has been introduced for evaluating the quality of a sample, however, it was analyzed to determine if kinetic parameters of a single sperm determine the resulting signal. Since CASA is now the most common way of analyzing semen parameters it was checked whether the signal from single sperm is correlated with its CASA parameters. For this purpose, a sperm was trapped in a corner and the signal measured, and the curved-line velocity (VCL), straight-line velocity (VSL), averaged-path velocity (VAP), beating cross frequency (BCF), amplitude of lateral head displacement (ALH) of that sperm. Sperm head rolling frequency (HRF), which has been proven to play a critical role in sperm rheotaxis as disclosed in Miki et al. "Rheotaxis guides mammalian sperm," Curr. Biol. 23:443-52 (2013), which is incorporated herein by reference in its entirety, was also measured. FIGS. 7A and 7B illustrate data related to the HRF based on the intensity of the head while sperm tracking. FIG. 7A illustrates head images over time in seconds. The stars on some images denote the incidence of the rolling in the sperm head. The scale bar is 10 µm. FIG. 7B illustrates the normalized head intensity over time. Rolling occurs if normalized head intensity increases over 1 and reduces back.

Figure 8A:
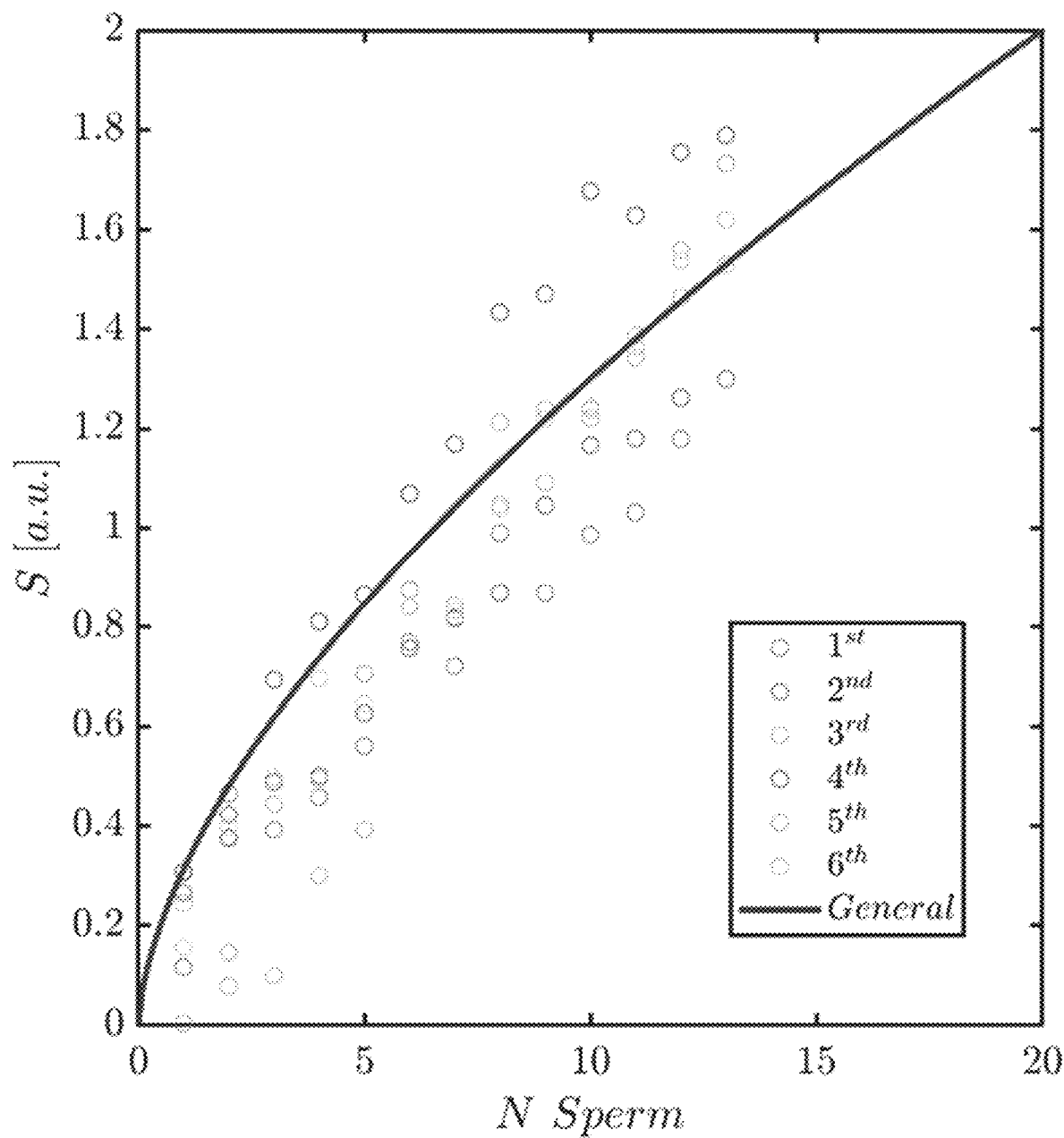
FIGS. 8A-8G illustrate a single sperm analysis of CASA and their correlation with the signal.
Figures 8B, 8C, 8D, 8E, 8F, 8G:
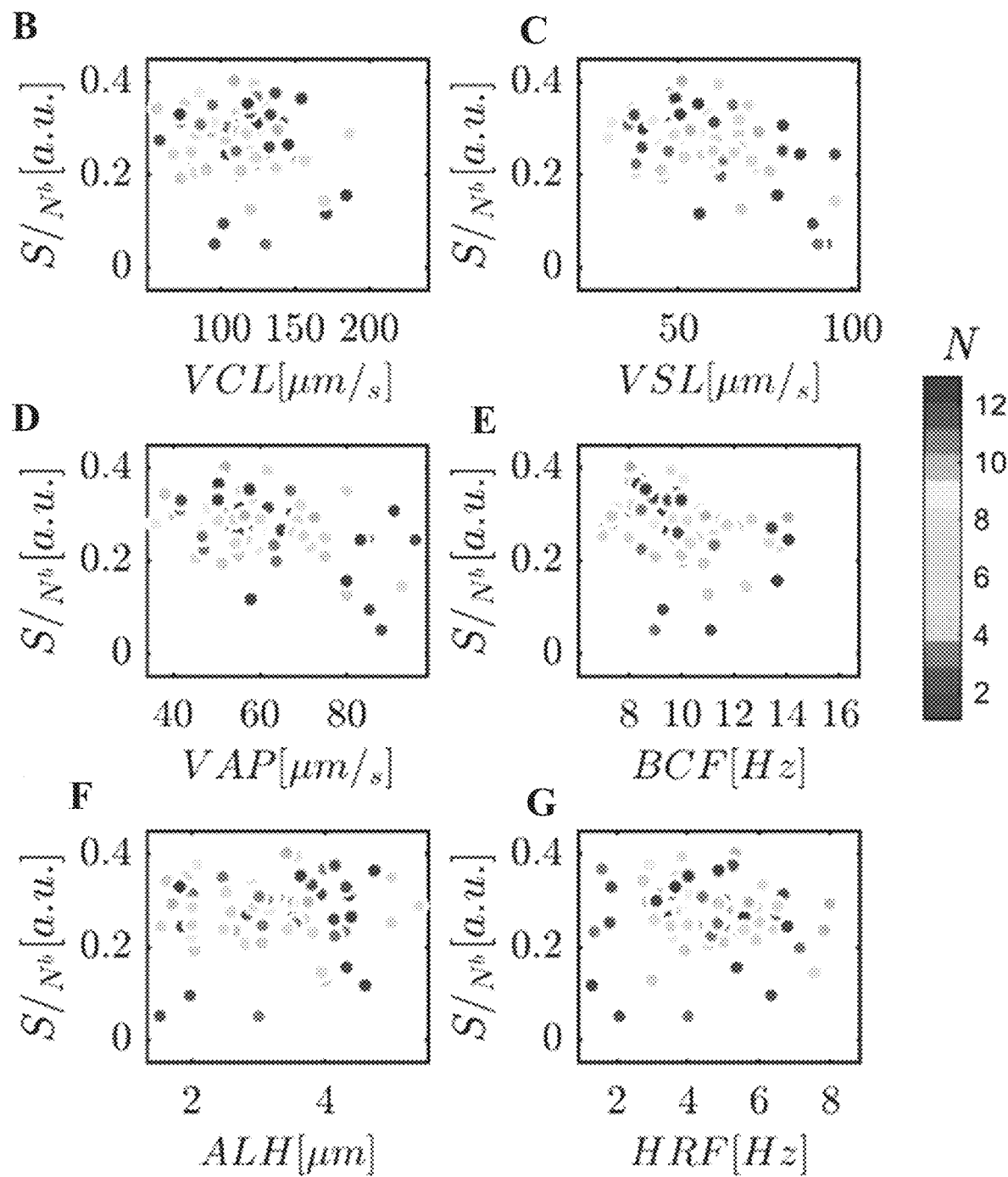

Then, another sperm was trapped in the same probe and the same parameters were measured. The process proceeded until 13 sperm were collected in the corner. The experiment was then repeated 6 times to create a pool of 78 data points for evaluation of whether the signal could predict any of the aforementioned parameters at single cell level. FIG. 8A illustrates the signal for the 13 sperm for the six experiments along with the power law.

As described above, the power b in $S=A \cdot N^b$ is likely determined by the corner angle. Therefore, the parameter $A=S/N^b$ should be related to sperm features. FIGS. 8B-8G show $S/N^b$ for the 6 mentioned experiments versus various sperm parameters. As shown in FIG. 8A, the signal and number of the sperm in the corner follows the general curve. However, as can be seen in FIGS. 8B-8G, parameter A shows no significant dependence on any of the CASA parameters. The data for head rolling frequency (HRF) also shows no relationship with normalized signal (FIG. 7G). Multivariable linear regression on the combination of the data, resulted in insignificant correlation between A and other parameters. On the other hand, the mean value for A is 0.32, which is consistent with the power law correlation.

Figures 9A, 9B, 9C, 9D:
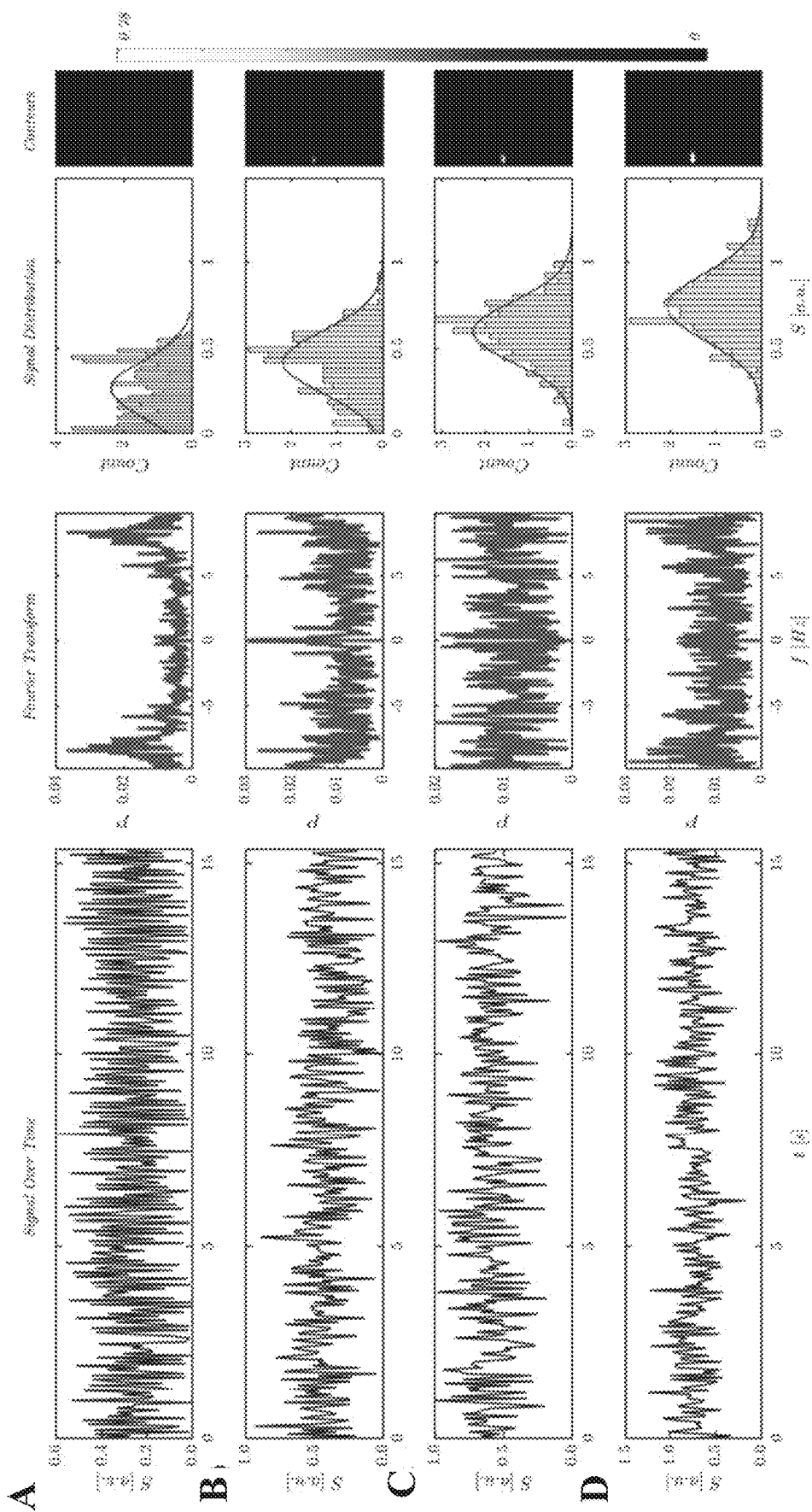
FIGS. 9A-9D illustrate signal analysis for a first to forth sperm trapped in the 20° degree probe. Each figure contains signal over time, FFT results of the same signal, signal distribution along with fitted normal distribution, and the contours of the same signal in the 15-second period.

The head intensity of sperm under the microscope fluctuates because of the head rolling. These fluctuations define HRF. FIGS. 9A-9D illustrate sperm signal and frequency analysis for the first to forth sperm trapped in the 20 degree probe of the device. A Fast Fourier Transform (FFT) of the signal over time reveals the HRF at single cell level (FIGS. 9A-9D). FFT of the signal specifies the head rolling frequency of the sperm in the probe when there is only one sperm. As the number increases to 2, the FFT no longer bears any meaningful peak. For example, in this case FIG. 9A is related to the first sperm and shows the rolling frequency as 9.2 Hz. Although at FIG. 9B another sperm was trapped in the same probe along with the first sperm the signal does not show any peaks at the 9.2 Hz. Another point is that FIG. 9A shows a bimodal distribution at S=0 and 0.48 which is due to the rolling effect on the signal (resembling an on-off signal with aforementioned frequency). But as the number increases the signal distribution becomes more like a normal distribution and standard deviation there becomes more like white noise. Since the head rolling frequency of the sperm in the trap are not equal or in synchronization, the signal over time could not distinguish between multiple sperm. Needless to say that the mean signal follows the signal-number power law despite that signal here is taken over a 15-second period.

Therefore at single cell level, the mean value of signal will not predict any CASA parameter though signal oscillations are attributed to HRF only for single sperm. So, the parameter A is a constant number in the case of bovine sperm, which gives the power law a general deterministic function of the number of sperm in the probe. In other words, the signal can be used to compare rheotaxis quality of various bovine samples.

Example 3—RHEOLEX at the Semen Level

Figures 10A, 10B, 10C:
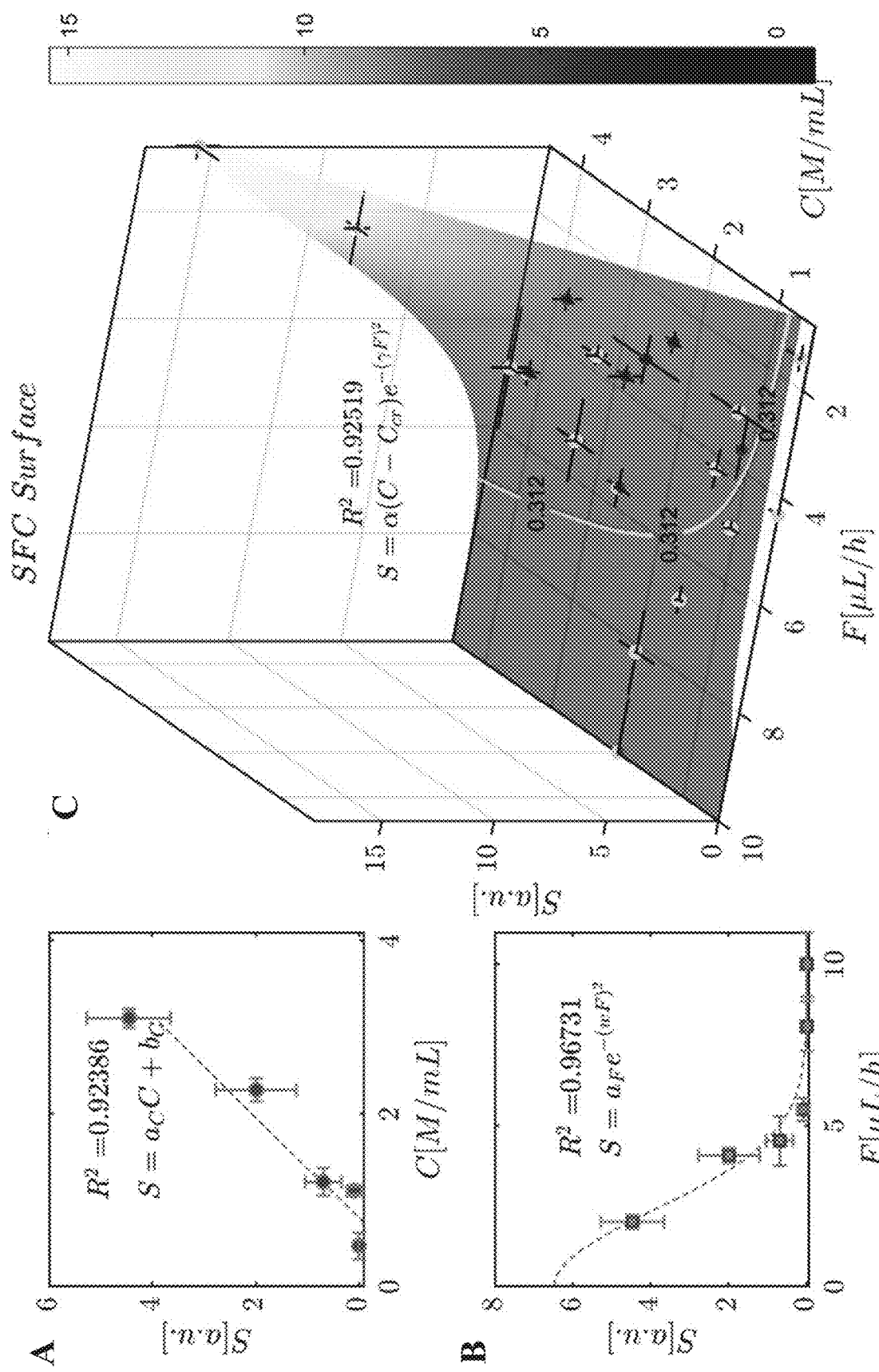
FIGS. 10A-10F illustrate RHEOLEX characterization of bull semen and kinetic properties.

At semen level, RHEOLEX can be used to evaluate the concentration of motile sperm. Sperm samples of different sperm concentrations were developed. At a constant flow rate of F=3.8 µL/h, C and S are linearly correlated ($R^2$=0.924) and there is a critical concentration below which the platform is not giving back any signals (FIG. 10A). At constant C=2.45M/mL, S reduces exponentially as F increases ($R^2$=0.967, FIG. 10B). Considering S as an exact differential of C and F, the following characteristics equation is obtained, which is illustrated in FIG. 10C, is called signal-flow rate-concentration (SFC) surface.

$$S=\alpha(C-C_{Cr})e^{-(\gamma F)^2} \quad \text{[Equation 5]}$$

In which α=4.26 mL/M, $C_{Cr}$=0.676 M/mL, and γ=0.2853 h/µL.

Referring now to FIGS. 11A-11E, which illustrate evolution of the characteristic curve through time at 1 minute intervals, variation of the signal with respect to concentration and flow rate assuming the signal as a complete differential can be combined to give a more general description of the outcome of the method.

$$dS=\partial S/\partial C \times dC + \partial S/\partial F \times dF \quad \text{[Equation 6]}$$

It is known that $\partial S/\partial C = \alpha_C$ and $\partial S/\partial F = -2\gamma^2 F \alpha_F e^{-(\gamma F)^2}$. By substituting these in the equation above, we can solve for S as a function of C and F as in the equation below:

$$S = \alpha(C - C_{Cr}) e^{-(\gamma F)^2} \quad \text{[Equation 7]}$$

By fitting this surface to 20 data points (that include the data in FIGS. 10A and 10B and 9 other experiments) α=4.26 mL/M, $C_{Cr}$=0.676 M/mL, and γ=0.2853 h/µL with $R^2$=0.925 is obtained. S can be substituted from the power law in the above equation.

$$AN^b = \alpha(C_{min} - C_{Cr})\ e^{-(\gamma F)^2} \quad \text{[Equation 8]}$$

For trapping at least one sperm in the corner N=1 is set, which results in the cyan curve in FIG. 10C or from Equation 8 above:

$$C_{min} = A/\alpha(e^{(\gamma F)^2} + C_{Cr}) \quad \text{[Equation 9]}$$

As F increases, $C_{min}$ that is needed for trapping at least one sperm, increases exponentially so that at F=7.5 µL/h a sample of $C_{min}$=7.18M/mL is needed for trapping only one sperm, yet at F=8 µL/h (6.6% increment from 7.5) $C_{min}$ increases to 13.5 M/mL (88.0% increase).

Figures 10D, 10E, 10F:
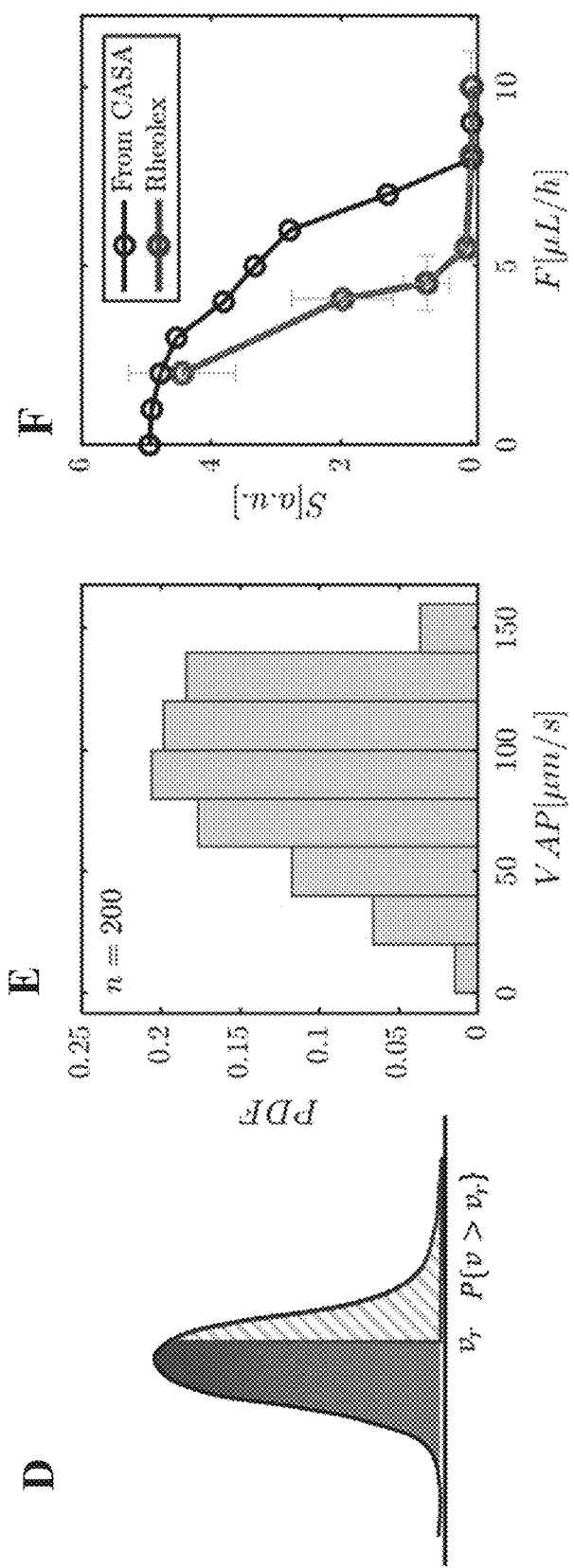
Figures 11A, 11B:
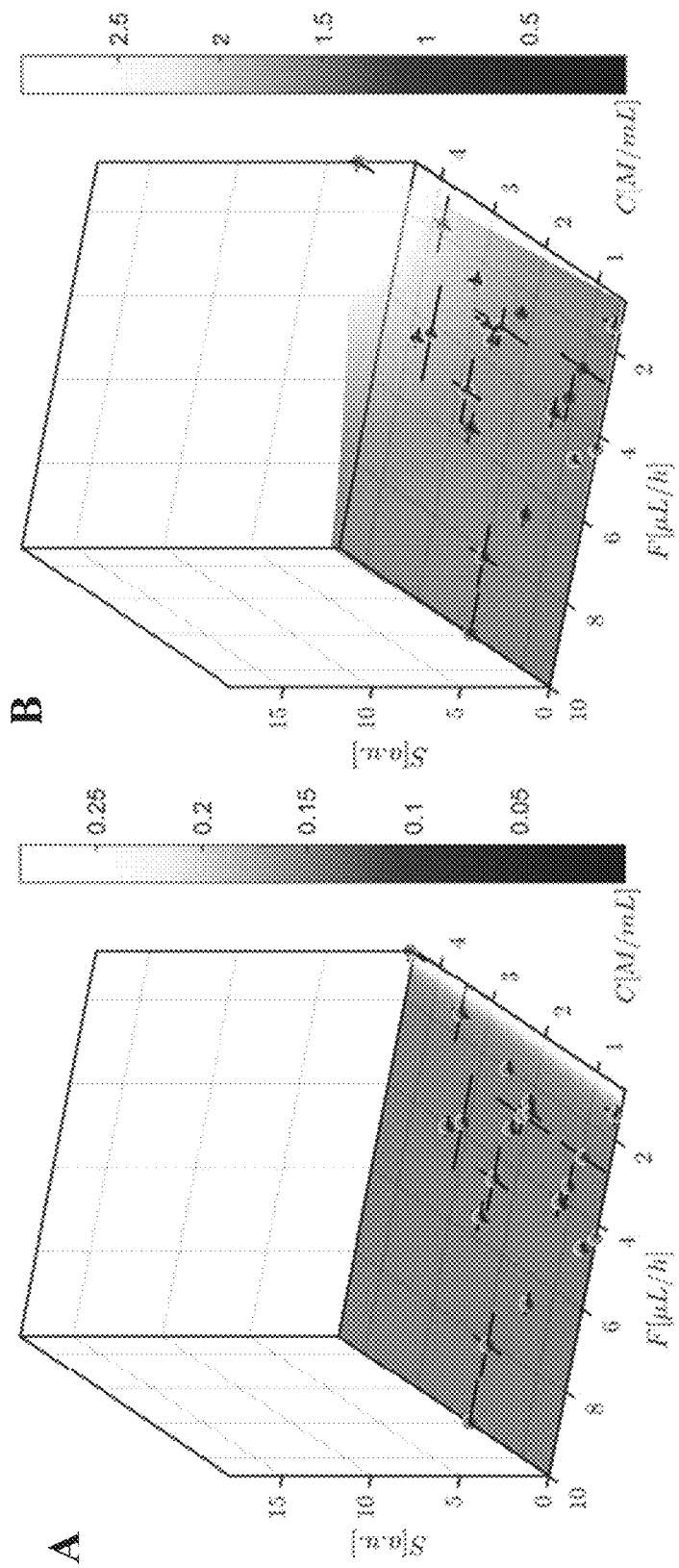
FIGS. 11A-11E illustrate evolution of a characteristic curve through time at 1-minute intervals.
Figure 11C:
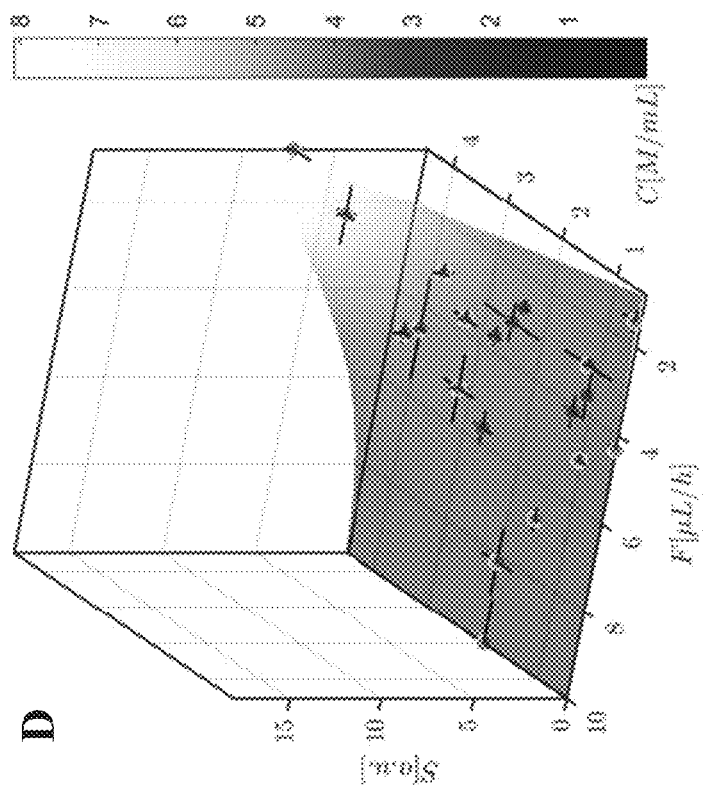
Figure 11D:
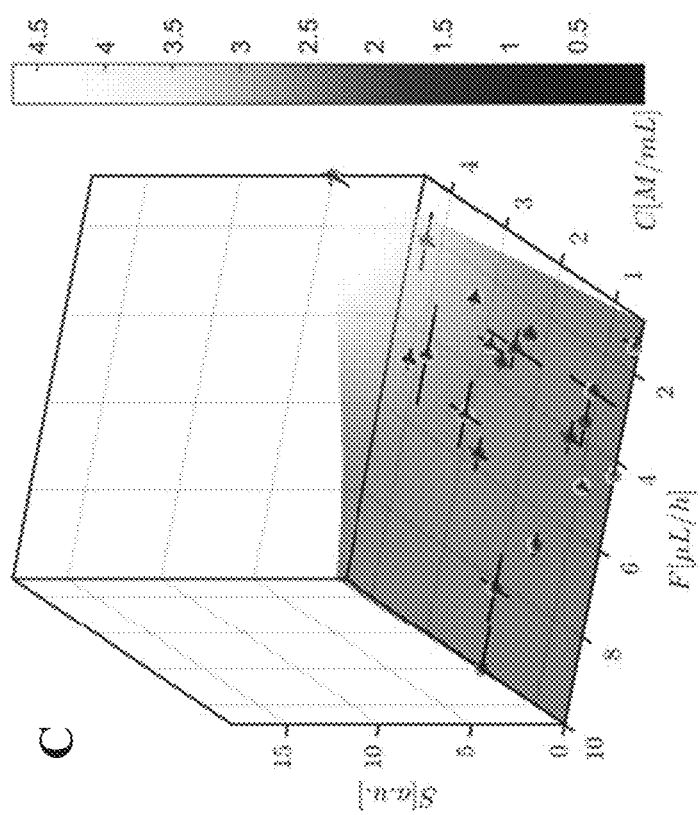
Figure 11E:
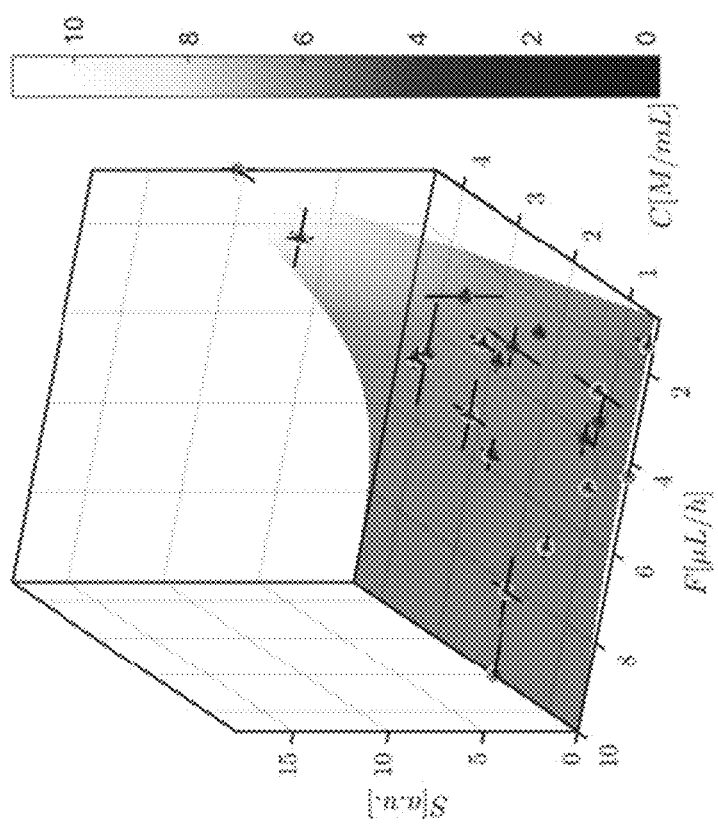

The signal can be predicted using VAP distribution. FIG. 10E shows the VAP distribution of the bull sample used for characterization of the SFC surface. Probability of sperm being trapped in the probe is the multiplication of the probability of sperm with VAP>$v_r$ by the efficiency of trapping. The total number of trapped sperm in 5 minutes (t) is equal to this probability multiplied by the total number of motile sperm ($N_M$) which is the volume of sample at the span of the probe plus the numbers that are brought in by the injection of sample multiplied to the motile sperm concentration.

$$N_M = \eta p\{v > v_r\} \times (V_0 + Ft)C \quad \text{[Equation 10]}$$

Using the signal-number power law provides, $$S = A(\eta pC(V_0 + Ft))^b \quad \text{[Equation 11]}$$

Because many of the sperm do not enter the rheotaxis zone, a small number of motile sperm become trapped in the probe (less than 1%) compared to the total motile sperm. When the efficiency of trapping value is 0.8%, C=2.45 M/mL, $V_0$=0.00754, (corresponding to 500 µm from the span) and VAP from CASA, the black curve in FIG. 10F can be calculated.

The signal at different times from initiation of injection to 4th minutes also follows the same pattern as shown in FIGS. 11A-11E. It starts near zero and as the time goes by it increases drastically for lower flow rates and higher concentrations.

The exponential dependence of signal and flow rate could be explained by the Gaussian distribution formula. It is assumed that if enough sperm is measured, the distribution of CASA parameters including (VAP) follows normal distribution (FIG. 10D). Therefore, probability of the number of sperm with velocity more than rheotaxis velocity (which is proportional to RHEOLEX) is an exponential function $S \propto e^{fcn(F)}$ in which fcn(F) is a function of F. That means the rate of reduction of the signal with respect to flow rate is exponential. Also, derivative of S is equal to zero at flow rate of zero; meaning $dS/dF=0|_{F=0}$. Thus, $fcn(F)=-(\omega F)^2$ is chosen, which satisfies both of the conditions in which $\omega$ is a constant.

Mean rheotaxis-zone velocity ($v_r$) is a linear function of F. At F=8.1 µL/h, $v_r$=150 µm/s (FIG. 6E) which is the maximum VAP for regular bovine sperm samples. This means that for F>8.1 µL/h, no matter how high the concentration would be, there is no chance that any sperm could be collected in the probe. This is predicted from FIG. 10C via the cyan curve which represents the relationship between C and F provided that only one sperm needed to be collected.

The VAP distribution of sample shown in FIG. 10E clearly indicates that there is no sperm with velocity higher than 150 µm/s. Theoretical recreation of signal from VAP, as described above, leads to FIG. 10F. The reason for the difference is that higher VAP does not account for better rheotaxis ability due to nonprogressive motility. Meaning, although VAP is high, sperm is not moving progressively to perform efficient navigation to be trapped in the probe. This effect becomes more pronounced at higher flow rates.

Example 4—RHEOLEX as a Measure of Fertility and Low DFI

Fertilization in mammalian species is a very complex process in which sperm undergoes several stages of maturation. Successful fertilization involves multiple factors. Sperm should be motile, it must undergo proper capacitation and DNA should be intact. If a sperm does not have any of these features fertilization fails. Studies show DNA integrity (Simon, et al. "Sperm DNA damage or progressive motility: which one is the better predictor of fertilization in vitro?" Syst. Biol. Reprod. Med. 57:133-8 (2011) and Evenson, et al. "Relation of mammalian sperm chromatin heterogeneity to fertility," Science 210:1131-3 (1980), which are incorporated by reference herein in their entireties) and capacitation score (CapScore) (Moody, et al. "Validation of a laboratory-developed test of human sperm capacitation," Mol. Reprod. Dev. 84:408-22 (2017), which is incorporated herein by reference in its entirety) can predict fertilization fate of a given sample on average. However, previous studies found no significant correlation between motility parameters and in vivo fertility using common methods. With the method developed in the present technology, RHEOLEX was measured, using three flow rates, for frozen thawed semen of 16 bulls with various sire conception rates (SCRs) to investigate the relationship between RHEOLEX and SCR. SCR is a normalized number of pregnancies in artificial insemination; the higher the SCR, the higher the fertilization.

Figure 12:
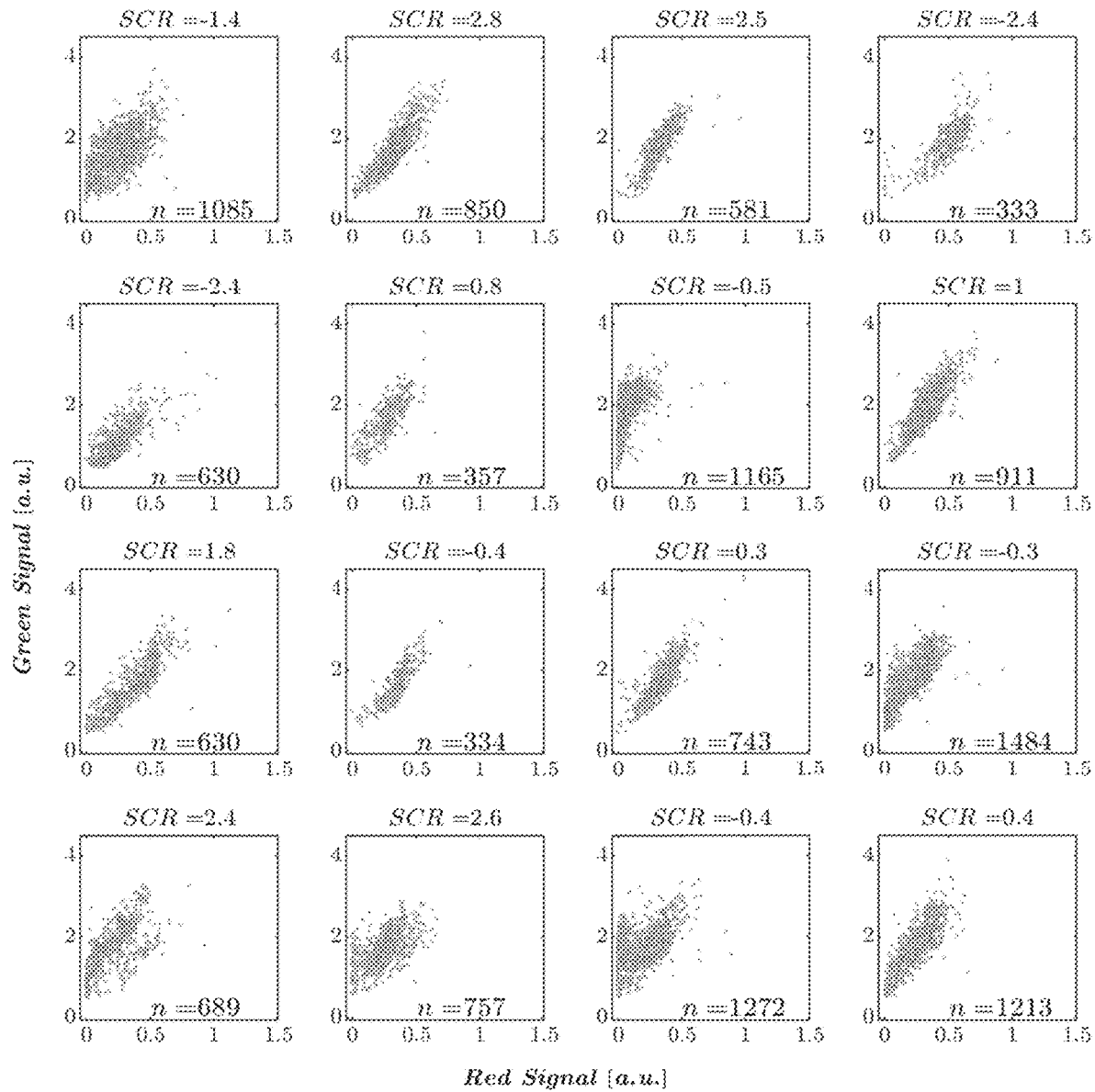
FIG. 12 illustrates red and green signal distribution of sperm heads in an AO test for 16 bulls along with the SCR value.
Figures 13A, 13B:
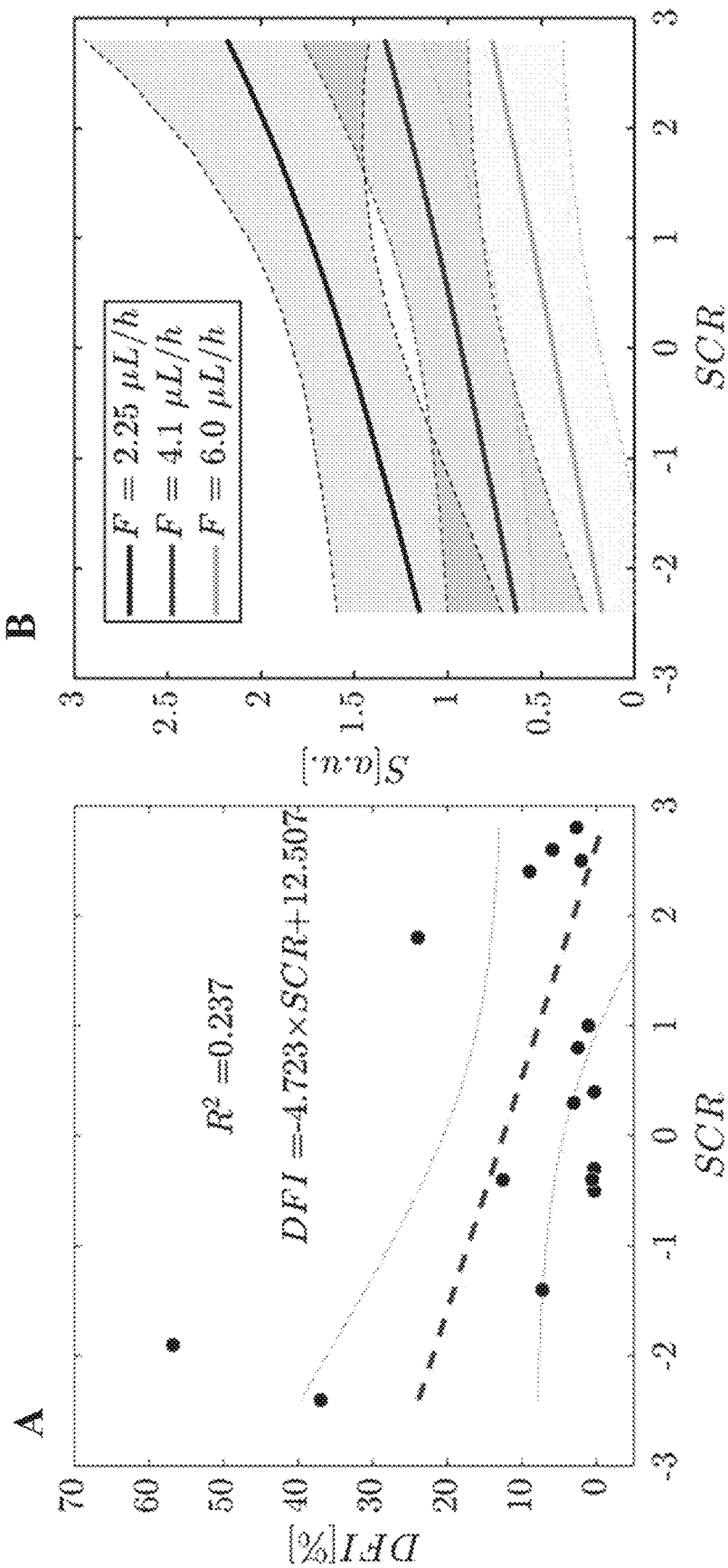
FIGS. 13A-13E illustrate DNA integrity and RHEOLEX for bulls of various fertility levels.

The DFI of these samples (FIG. 12) was measured using the Acridine Orange (AO) test. Yaghoobi, et al. "Progressive bovine sperm separation using parallelized microchamber-based microfluidics," Lab Chip 21:2791-804 (2021), the disclosure of which is incorporated by reference herein in its entirety. FIG. 13A shows the dependence of DFI on SCR. The regression line clearly depicts the inverse relationship between DFI and SCR; meaning that bulls with lower DNA fragmentation will be more likely to have higher SCR.

Figure 14:
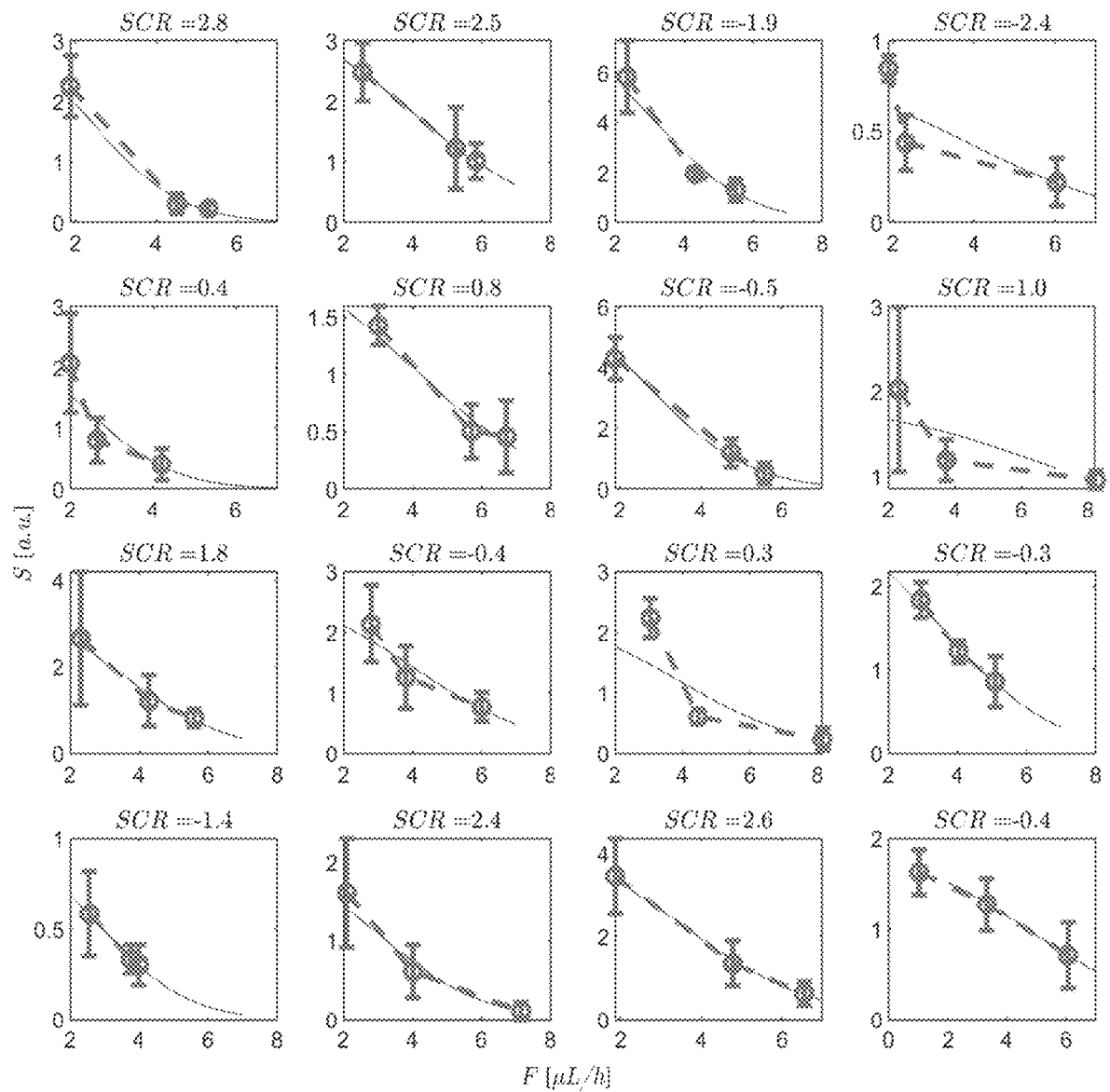
FIG. 14 shows RHEOLEX with respect to flow rate for various bulls.

A linear model with a random slope by bull was fit to assess the relationship between RHEOLEX and SCR, flow rate, and concentration. Of the various transforms investigated, the 1−1/(1+exp(S)) resulted in residuals that appeared normally distributed and most significant p-values. As expected, concentration was positively associated with RHEOLEX (p=0.004) and flow rate was negatively associated with RHEOLEX (p<0.0005); SCR was also positively associated with RHEOLEX (p=0.032). For the purposes of illustration, FIG. 13B shows the average RHEOLEX by SCR with concentration 2M/mL, at flow rates 2.25, 4.1 and 6 µL/h predicted by the model. The positive association between RHEOLEX and SCR is visually apparent as is the significant difference between average RHEOLEX at the different flow rates, particularly for SCR between 0 and 1. FIG. 14 and Table 1 (above) illustrate additional data.

Specifically, FIG. 14 shows the value of RHEOLEX from the aforementioned 16 bulls. Since the viscosity of semen from males differ from each other, the same inlet reservoir height does not result in the same flow rate for all. But for the purpose of comparison the RHEOLEX for each of the bulls should be at the same flow rates. Signal has an exponential decay relationship with the square of the flow rate. Therefore, $S = C_1 e^{-C_2 F^2}$ and thus $\ln(S) = k - C_2 F^2$. This means that the logarithm of S and F squared have a linear correlation. Blue lines in the FIG. 14 are calculated based on this linear relationship. This way, we are able to compare RHEOLEX from the same flow rates.

Figures 13C, 13D, 13E:
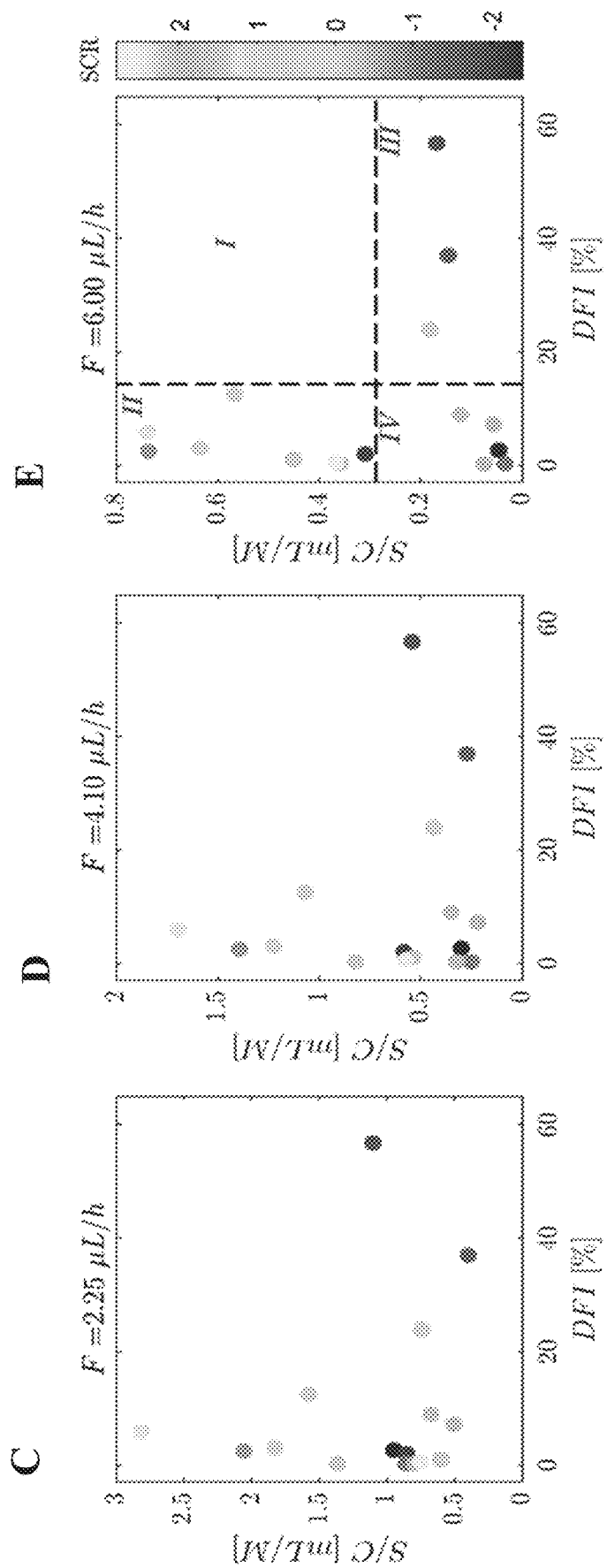
Figures 15A, 15B, 15C:
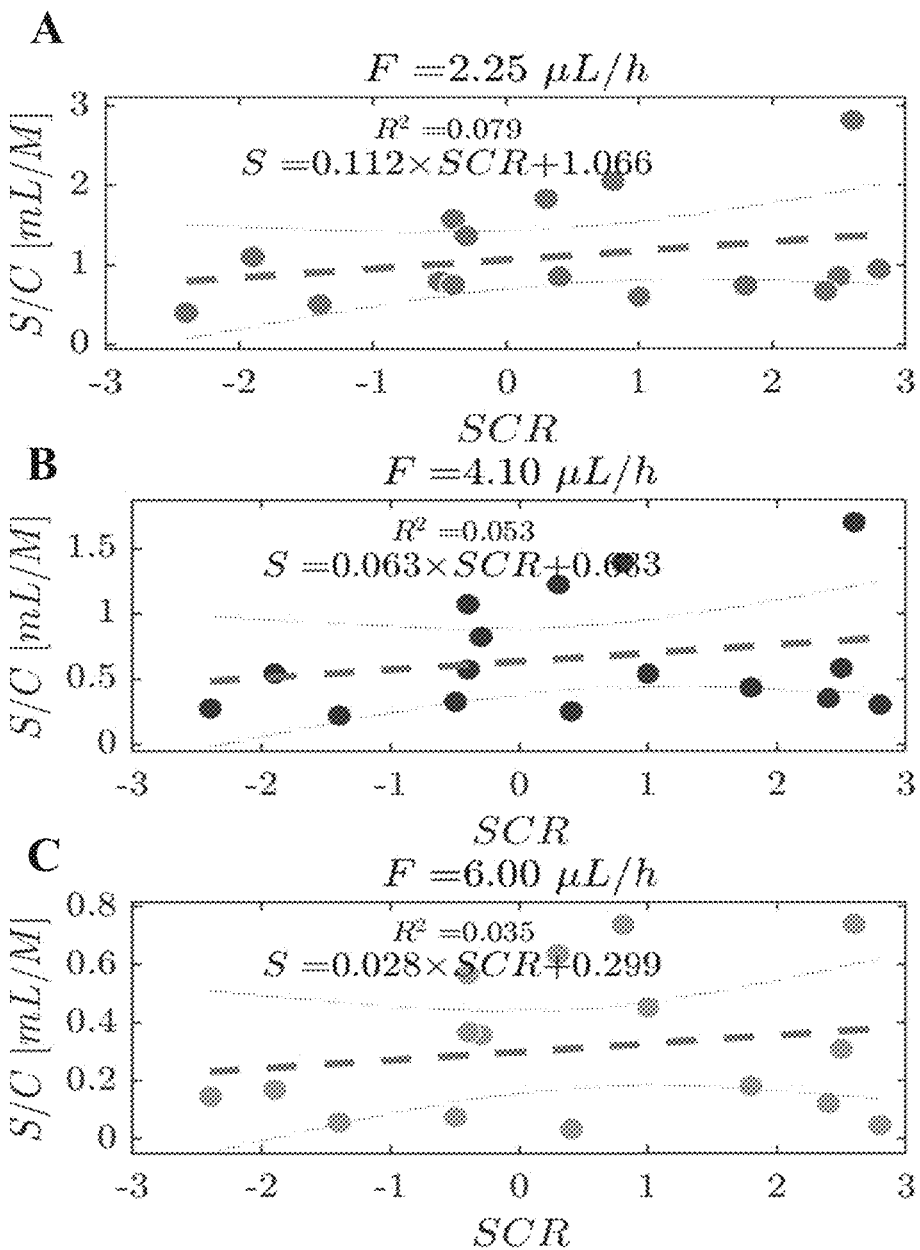
FIGS. 15A-15C show relative RHEOLEX over SCR (first row) and DNA integrity (second row) for flow rates of 2.25 (FIG. 15A), 4.1 (FIG. 15B), and 6 μl/h (FIG. 15C). At the highest flow rate, the relative RHEOLEX more than 0.3 is associated with DFI less than 15%. However, for values less than 0.3 relative RHEOLEX is not discriminating between high or low fragmentation index. Dotted lines in the first row shows the 95% confidence interval. Notice that in all the figures of the second row, the first quadrant is empty. This specifies that it is not possible to have samples of high fragmentation and high RHEOLEX.
Figure 16:
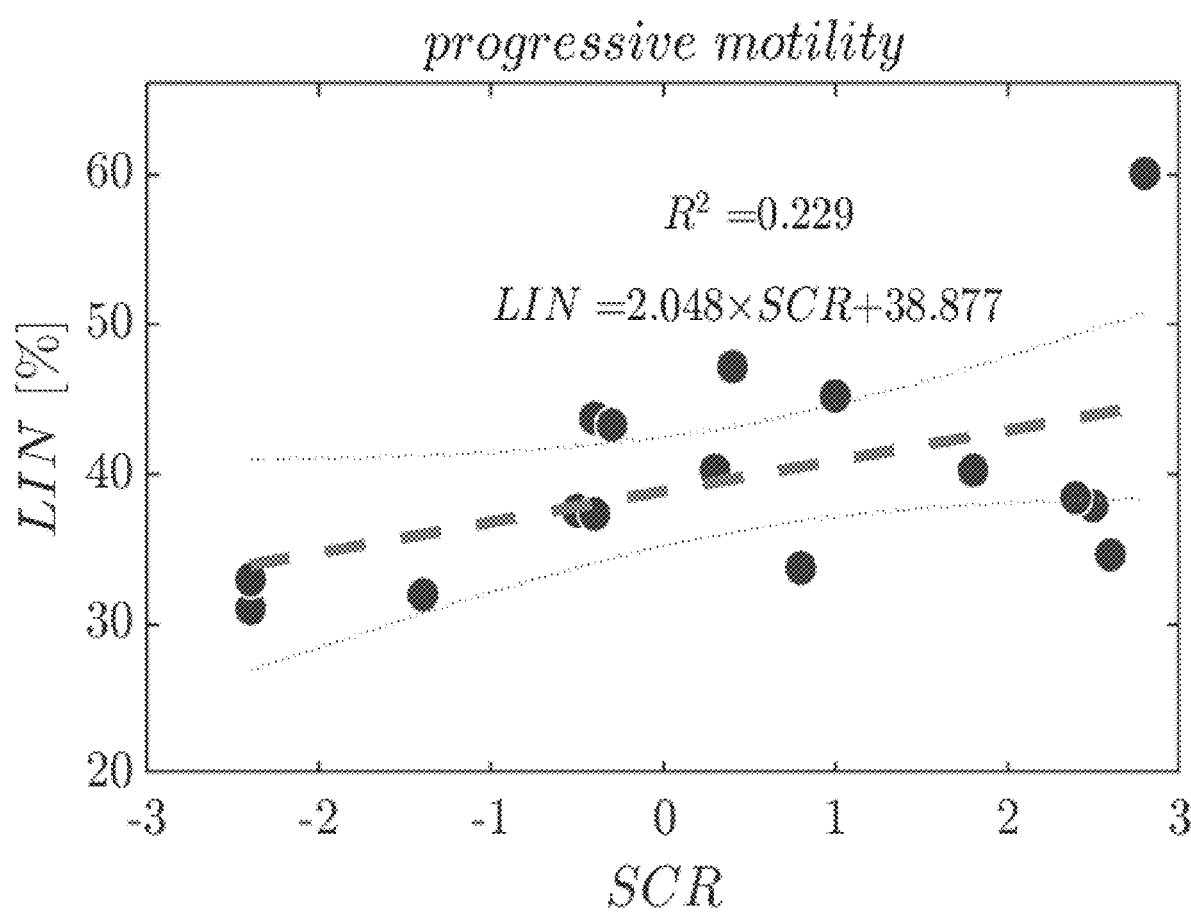
FIG. 16 shows progressive motility of bull samples with respect to SCR.

Unlike DFI, RHEOLEX is a concentration dependent variable. To remove dependency on concentration, relative RHEOLEX is defined as RHEOLEX divided by concentration. Not only does relative RHEOLEX increase as SCR increases with different flow rates (FIG. 15), but also it distinguishes low-DFI bulls at higher flow rates (FIGS. 13C-13E). At low to medium flow rates, there is a slight negative trend between relative RHEOLEX and DFI. Interestingly, at F=6 μL/h, the points form four regions in the diagram according to DFI=15% and relative RHEOLEX=0.3 (dashed lines in FIG. 13E). Region I is empty; Region II contains bulls of low-DFI and high SCR; region III features higher DFI with lower SCR while region IV includes an amalgam of SCR levels. For relative RHEOLEX more than 0.3, 100% of the bulls have less than 15% DFI though for relative RHEOLEX less than 0.3, DFI status cannot be distinguished with certainty. That is an important feature which indicates the value of RHEOLEX in determining DFI level. CASA parameters, on the other, resulted in no statistically significant relationship with SCR. Progressive motility which has been successfully reported to predict ART outcomes came close with a positive slope yet not statistically significant (p>0.05 in FIG. 16).

A microfluidic platform was developed to measure the number of sperm which can undergo rheotaxis at specified flow rates and associated shear rates, by a virtual staining model. The dimension and shape of the channel and the flow rates generated were designed to mimic those of narrow structure of UTJ in the female reproductive tract. In addition, the operation time for testing is 5 minutes and the method requires no sophisticated laboratory equipment or special skills rendering it suitable for implementation in clinics for human studies. None of the CASA parameters at cell level showed any role in the signal but single sperm rolling frequency could be detected from the FFT of the signal over time. On the other hand, CASA parameters at semen level showed reasonable agreement with the signal outcome of the device.

The platform was used to characterize concentration of motile sperm at various flow rates. VAP distribution may be used for prediction of rheotaxis success of a sperm sample yet at higher shear rates CASA fails to provide acceptable estimation due to accumulation of non-progressively motile sperm.

Frozen thawed sperm samples of 16 bulls with SCR −3 to +3 were tested with this microfluidics device to measure the RHEOLEX. Statistical analysis showed that as SCR increases, the average RHEOLEX increases; meaning that for a semen of higher rheotaxis quality, it is more likely that the bull has a higher fertility level.

DFI analysis provided evidence that all samples with relative RHEOLEX more than 0.3 at flow rate 6 μL/h, posses low DFI whereas at lower values samples might have high or low DFI. Therefore, this parameter can be used to evaluate the approximate DFI level of a sample as well as the fertility level. Since SCR is an in vivo fertility scale, this positive trend clearly supports the notion that female reproductive tract of mammalian species might choose for rheotaxis in sperm among other motility-related features. More importantly, fertility evaluation with this method is not intrusive and the sperm separated by rheotaxis could be used in the ARTs to promote the outcome Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed:

1. A method of evaluating rheotaxis quality in a sperm-containing sample, the method comprising:
   providing a microfluidic system comprising:
      a housing having a first end and a second end and containing a passage connecting the first and second ends;
      an inlet at the first end of said housing for charging fluids into the passage proximate to the first end of said housing;
      an outlet at the second end of said housing for discharging fluids from the passage proximate to the second end of said housing; whereby fluid flows from said inlet, through the passage, and into said outlet; and
      one or more probes within the passage, each of said probes comprising a closed side and a partially open side, wherein the closed side is closer to the first end than the partially open side with the closed side and the partially open side defining between them a confinement region suitable for retaining motile sperm;
   injecting a sperm-containing sample through the inlet, through the passage, and through the outlet of said microfluidic system at a flow rate, whereby motile sperm are retained within the one or more probes;
   obtaining, by an image processing computing device, a sequence of images of the confinement region of at least one of the one or more probes having said motile sperm retained therein over a period of time;
   processing, by the image processing computing device, said sequence of images of the region to determine a signal intensity value for said sequence of images, wherein said signal intensity value is based on a concentration of the motile sperm located in the confinement region at the flow rate; and
   determining, by the image processing computing device, a rheotaxis quality value for said sperm-containing sample based on the signal intensity value.

2. The method of claim 1, wherein the microfluidic system comprises a plurality of probes spaced apart within the passage.

3. The method of claim 1, wherein the plurality of probes are spaced apart by a distance of at least 2.5 mm.

4. The method of claim 1, wherein the one or more probes are V-shaped.

5. The method of claim 4, wherein the partially open side of the one or more probes has an opening at an angle between 20° to 50°.

6. The method of claim 1, wherein the one or more probes are configured and arranged within the passage to form a rheotactic region proximate to the partially open side of each of the one or more probes.

7. The method of claim 1, wherein the passage has a depth of about 30 μm.

8. The method of claim 1, wherein the one or more probes have a width at the partially open side of about 300 μm.

9. The method of claim 1, wherein the microfluidic system further comprises:
a pump positioned to move fluids within the passage from the first end of the housing to the second end of the housing.

10. The method of claim 1, wherein the processing further comprises:
subtracting, by the image processing computing device, consecutive images in said sequence of images from one another; and
averaging, by the image processing computing device, the subtracted images over said sequence of images to determine the signal intensity value for the sequence of images.

11. The method of claim 1, wherein the one or more probes have sharp edges at the partially open side to increase residence time in the confinement region.

12. The method of claim 1, wherein said sequence of images comprises at least fifty images.

13. The method of claim 1, wherein said period of time is at least 5 minutes.

14. The method of claim 1 further comprising:
determining, by the image processing computing device, an in vivo fertility level for the sperm-containing sample based on the rheotaxis quality value.

15. The method of claim 1 further comprising:
determining, by the image processing computing device, a DNA fragmentation index (DFI) value for the sperm-containing sample based on the rheotaxis quality value.

16. The method of claim 15, where the determining the DFI value comprises:
determining, by the image processing computing device, the concentration of the motile sperm located in the confinement region based on the rheotaxis quality value;
dividing, by the image processing computing device, the rheotaxis quality value by the concentration to remove dependence of the rheotaxis quality value on concentration; and
determining, by the image processing computing device, the DFI value based on the concentration independent rheotaxis quality value.

17. The method of claim 1, wherein the rheotaxis quality value has a power law correlation to the concentration of the motile sperm located in the confinement region.

18. A system for quantifying rheotaxis in a sperm-containing sample, the system comprising:
a microfluidic system comprising:
a housing having a first end and a second end and containing a passage connecting the first and second ends;
an inlet at the first end of said housing for charging fluids into the passage proximate to the first end of said housing;
an outlet at the second end of said housing for discharging fluids from the passage proximate to the second end of said housing; whereby fluid flows from said inlet, through the passage, and into said outlet; and
one or more probes within the passage, each of said probes comprising a closed side and a partially open side, wherein the closed side is closer to the first end than the partially open side with the closed side and the partially open side defining between them a confinement region suitable for retaining motile sperm; and
an image processing computing device comprising a non-transitory computer readable medium comprising programmed instructions stored thereon and one or more processors coupled to the computer-readable medium and configured to execute the stored programmed instructions to:
obtain a sequence of images of the confinement region of at least one of the one or more probes after a sperm-containing sample is injected through the inlet, through the passage, and through the outlet of said microfluidic system at a flow rate, whereby motile sperm are retained within the one or more probes, the one or more probes having said motile sperm retained therein over a period of time;
process said sequence of images of the confinement region to determine a signal intensity value for said sequence of images, wherein said signal intensity value is based on a concentration of the motile sperm located in the confinement region at the flow rate; and
determine a rheotaxis quality value for said sperm-containing sample based on the signal intensity value.

19. The system of claim 18 further comprising:
an imaging system coupled to the image processing computing device and configured to capture the sequence of images of the confinement region of at least one of the one or more probes having said motile sperm retained therein over a period of time.

20. The system of claim 19, wherein the imaging system comprises a fluorescence detector, a camera, a complementary metal-oxide-semiconductor (CMOS) camera, an image sensor, a charge-coupled device ("CCD") sensor, a CMOS sensor, an optical detector, or a video detector.

* * * * *